(12) United States Patent
Fukasawa et al.

(10) Patent No.: US 6,598,073 B2
(45) Date of Patent: *Jul. 22, 2003

(54) PROCESSING COMMON WORK USING FLEXIBLE COMMAND STRINGS

(75) Inventors: Toshihiko Fukasawa, Machida (JP); Hiroshi Okazaki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,762

(22) Filed: Jul. 17, 1996

(65) Prior Publication Data

US 2002/0042814 A1 Apr. 11, 2002

(30) Foreign Application Priority Data

Jul. 18, 1995 (JP) .............................................. 7-181689

(51) Int. Cl.$^7$ .............................................. G06F 15/16
(52) U.S. Cl. ........................ 709/204; 709/205; 709/101
(58) Field of Search ....................... 395/200.34, 200.35; 345/329, 330, 370; 370/260, 261, 270; 379/21, 93; 709/204, 205, 201, 105, 101, 106

(56) References Cited

U.S. PATENT DOCUMENTS

| | | | | |
|---|---|---|---|---|
| 5,014,267 A | * | 5/1991 | Tompkins et al. | 709/204 |
| 5,195,086 A | * | 3/1993 | Baumgartner et al. | 709/204 |
| 5,206,934 A | * | 4/1993 | Naef, III | 395/200 |
| 5,446,842 A | * | 8/1995 | Schaeffer et al. | 395/200.01 |
| 5,448,263 A | * | 9/1995 | Martin | 345/173 |
| 5,448,739 A | * | 9/1995 | Jacobson | 709/320 |
| 5,515,492 A | * | 5/1996 | Li et al. | 395/155 |
| 5,530,882 A | | 6/1996 | Sasaki et al. | 395/800 |
| 5,717,859 A | * | 2/1998 | Yunoki | 395/200.12 |
| 5,724,530 A | * | 3/1998 | Stein et al. | 395/329 |

* cited by examiner

*Primary Examiner*—Mark H. Rinehart
*Assistant Examiner*—Marc D. Thompson
(74) *Attorney, Agent, or Firm*—Fitzpatrick, Cella, Harper & Scinto

(57) ABSTRACT

For a common work unit in a plurality of processors, a new application can be associated with the common work unit. A processing system for performing a common work in a work environment having one or more processors, comprising a means for specifying a unit (session) of common work, a means for operating the above common work unit a means for describing the above operation as an operation to a component of the above common work unit (corresponding to a script), and a means for executing the operation described by the above operation description means.

14 Claims, 18 Drawing Sheets

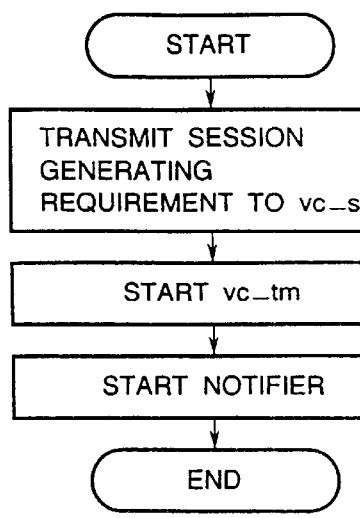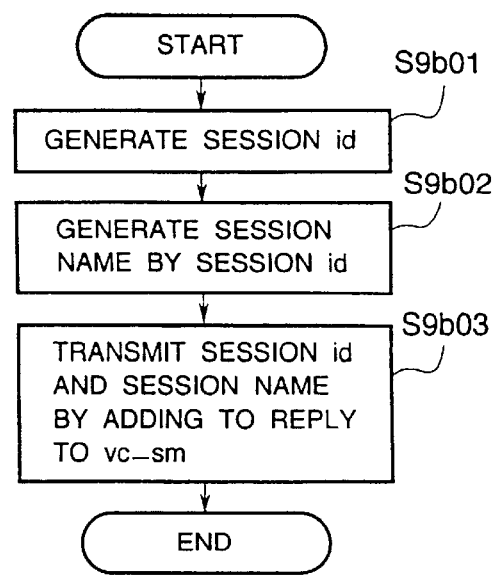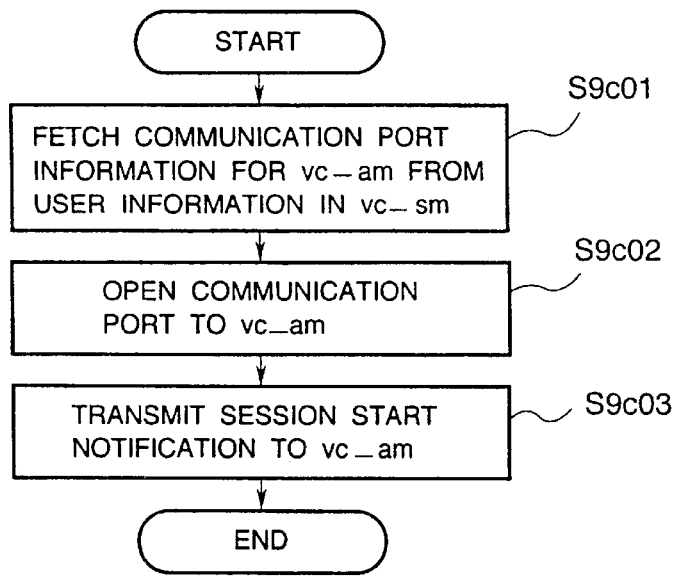

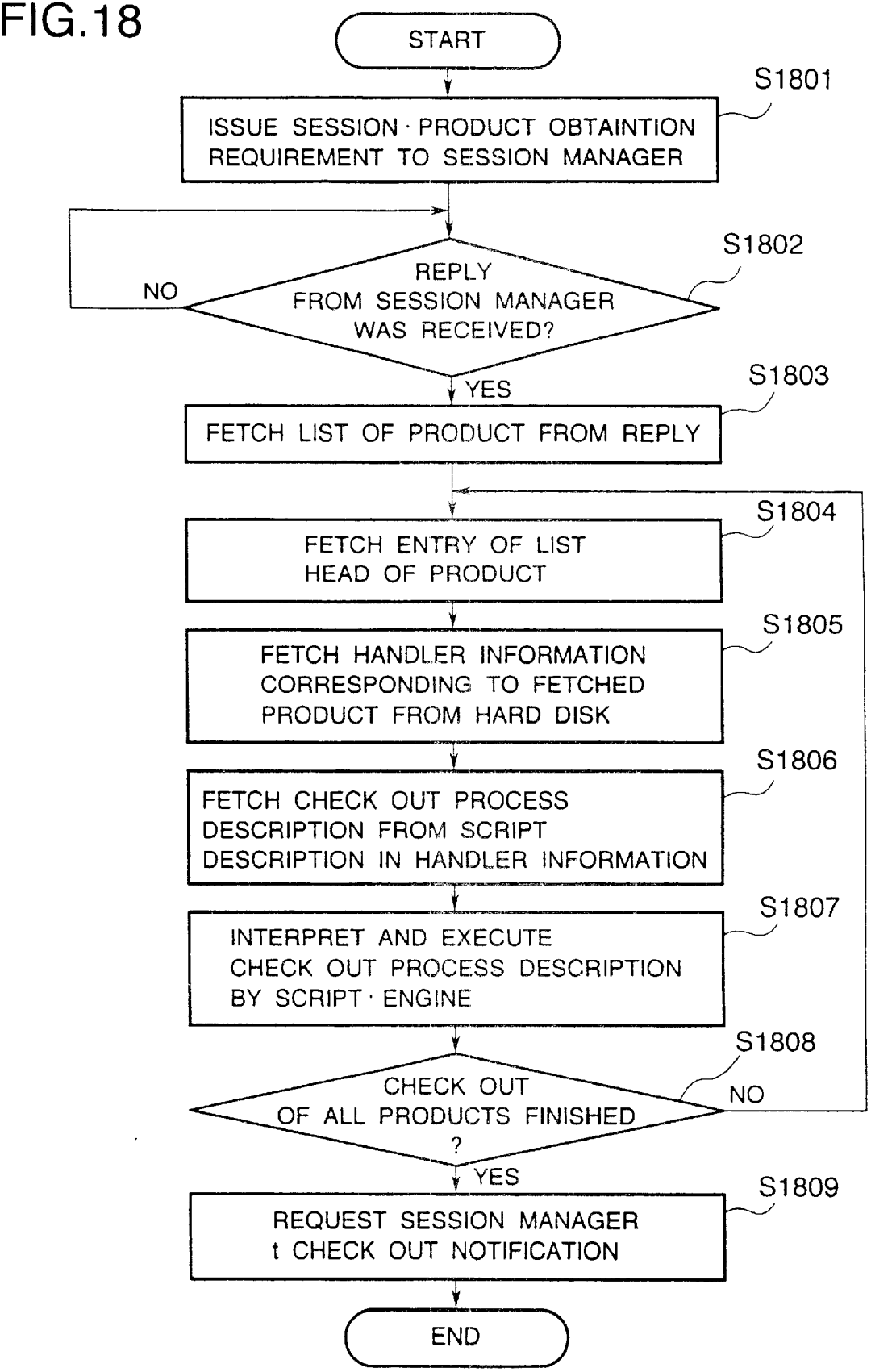

PROCESSING COMMON WORK USING FLEXIBLE COMMAND STRINGS

BACKGROUND OF THE INVENTION

1. Field of the Invention

The present invention relates to a processing system for permitting a plurality of users to work in common on a plurality of processors, processors in the processing system, its processing method, and a storage medium in which a program representing the processing method is stored.

2. Related Background Art

In recent years, there is proposed a so-called groupware system which supports multiple users in working in common by combining a plurality of personal computers or computers such as workstations so that data can be exchanged or shared, and it becomes practically used. There is a groupware system which makes the common work to be operated as a unit like an application program by conceptualizing the common work executed on it by using software.

A relationship, however, between this common work unit (temporarily called a session) and an application used on the session practically varies according to its situation.

Accordingly, in the conventional system, a session must be limited to a place for just a common work to be managed independently of an application program used in the system. In other words, it cannot relate (enable) a new application program to the session.

SUMMARY OF THE INVENTION

Accordingly, it is an object of the present invention to provide a processing system which can provide various common work units easily and use various application programs freely according to the common work units in a wide range of sessions so that the common works can be performed favorably, processors in the processing system, its processing method, and a storage medium for storing a program for specifying the processing method.

It is another object of the present invention to provide a processing system in which an application can be arbitrarily set for each session, processors in the processing system, its processing method, and a storage medium for storing a program for specifying the processing method.

It is another object of the present invention to provide a processing system having a user interface which can easily cope with participation or leaving to or from various sessions, processors in the processing system, its processing method, and a storage medium for storing a program for specifying the processing method.

It is still another object of the present invention to provide a processing system having new functions, processors in the processing system, its processing method, and a storage medium for storing a program for specifying the processing method.

Other features of this invention will be apparent from the drawings and description of preferred embodiments which follow.

BRIEF DESCRIPTION OF THE DRAWINGS

FIGS. 9A to 9C are flowcharts of the session start processing in FIG. 4;

FIG. 18 is a flowchart representing the desktop manager processing in FIG. 16.

DETAILED DESCRIPTION OF THE PREFERRED EMBODIMENTS

[First Embodiment]

In this embodiment, the first aspect of the present invention is described by using a drawing.

Figure 1:
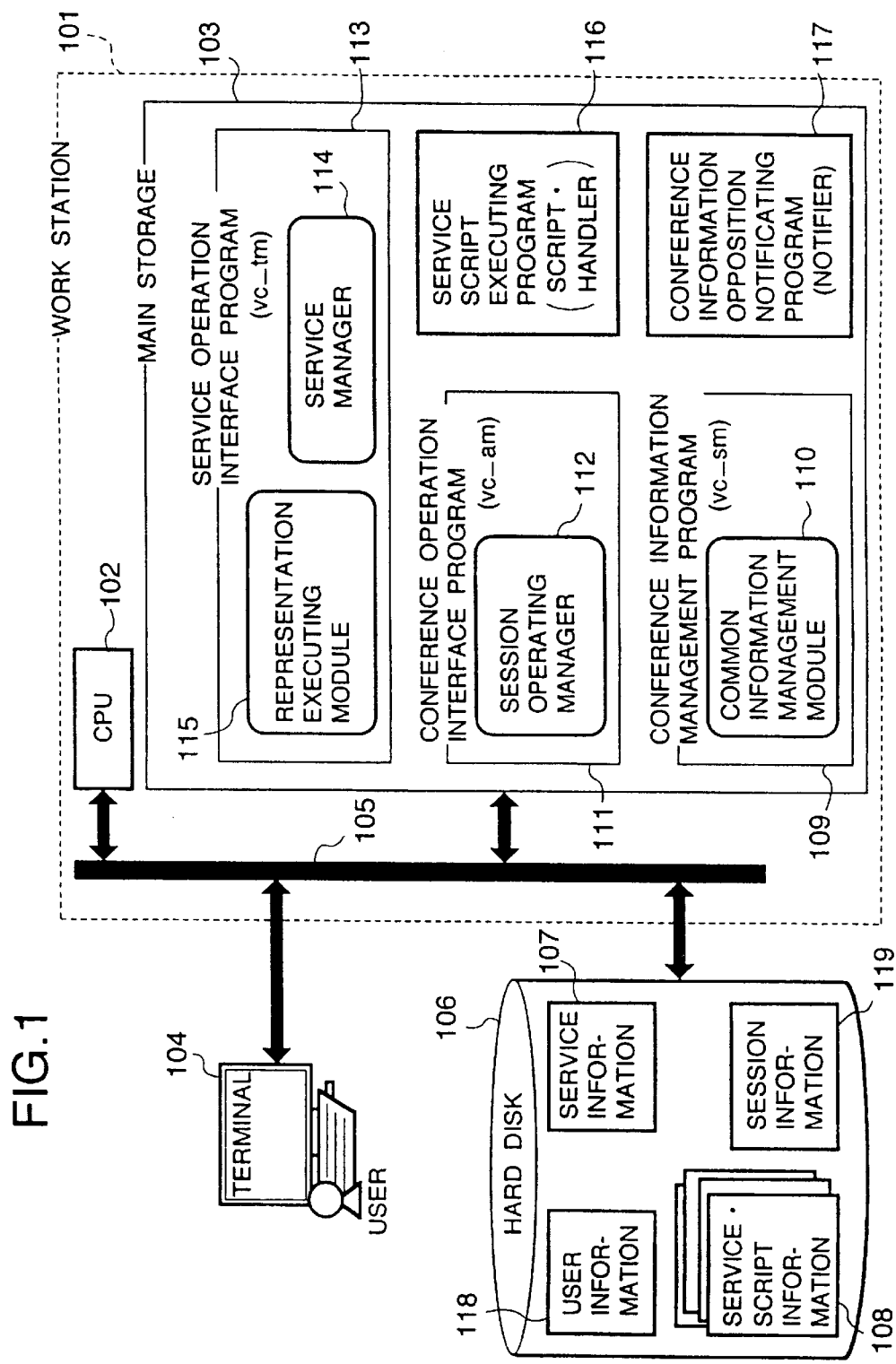
FIG. 1 is a configuration diagram of a conference management system used in a first embodiment of the present invention.

FIG. 1 shows a configuration of a conference management system. This conference management system supports general conferences as common works. A management unit corresponding to the "conference" is called a session in this embodiment. Referring to FIG. 1, a workstation 101 comprises a CPU 102 for executing processing in this embodiment coupled with a main storage 103 for storing a basic software group (109, 111, 113, 116, and 117) for this conference management system via a computer bus 105. Additionally, the workstation 101 is coupled to a hard disk 106 for storing permanent data required for processing in this embodiment and a terminal 104 for providing a user interface used by a user for system operations. For various operations performed by a user described later, a keyboard or a pointing device (not shown) is used for the input operations. For this system, the following five types of programs are provided as basic software.

vc_sm [Conference Information Management Program 109]

The conference information management program 109 is provided as a program named vc_sm, used for management of user information 118 related to conferences or session information 119 as common information shared by a plurality of programs.

These types of common information is stored in the hard disk 106 and read out by the conference information management program 109 properly. Referring to FIG. 1, service information 107 and service script information 108 stored in the hard disk 106 are also managed as common information by the conference information management program 109. The center of the conference information management program 109 is called a common information management module 110.

The common information management module 110 automatically allocates an id number unique in the same type of data (it is called a user id or a session id, combined with a name representing a type of data) to common information under management.

A client (other basic software 111, 113, 116, and 117) of the conference information management program 109 specifies common information principally by using this id number.

Although the common information management module 110 in this embodiment is packaged as a collection of simple arrays each having an integer as an index, a hash table or other data management system can be used for the module. Only a single vc_sm 109 is started in the whole system. It is also possible to apply a configuration in which the vc_sm 109 is kept in a workstation dedicated to vc_sm 109 as described later.

vc_am [Conference Operation Interface Program (111)]

The conference operation interface program 111 is provided as a program named vc_am, used for providing a user interface for a start or finish operation described later for a session (conference) provided by this system. The main processing of vc_am 111 is controlled by a session operating manager 112. The session operating manager 112 is used to reference or modification of session information managed by vc_sm 109 according to a requirement of operating a session as a client of vc_sm 109. vc_am 111 is started one by one in each user environment of this system user.

vc_tm [Service Operation Interface Program (113)]

The conference operation interface program 113 is provided as a program named vc_am, used for providing a user interface for a start or finish operation of an application program in a session. In this system, an application described above is called a service.

For example, a camera (not shown) image or a video server (not shown) image of each terminal user, which is a common editor or an application for a video conference, is used as a service.

vc_tm is started in each user environment by the number of sessions in which a user is participating, and each vc_tm manages applications used in respective sessions in which the user is participating.

Two important modules exist in vc_tm 113.

Service Manager 114

The service manager 114 is a module for managing information required for a start or finish operation of a service. Information sharable among a plurality of users in service-related information is managed by vc_sm 109, while information specific for an individual user is managed in a service manager 114.

Representation Executing Module 115

The representation executing module 115 requires vc_tm which is managing the environment to execute the processing as the representation when some common work processing is performed in other user environments by vc_am 111 or vc_tm 113. The representation executing module 115 is used for providing an interface for its purpose.

Script Handler [Service Script (Described Later) Executing Program (116)]

There are various services which can be used for common works by users, and each service requires its corresponding control to control an operation of providing or finishing the service. Description of a control method of a service usable from the vc_tm is called service script. The service script is stored in the hard disk 106 as service script information 108 and managed by vc_sm 109. It is the service script executing program 116 to interpret and execute this service script. The service script executing program 116 is also called a script handler, which is a command properly started by vc_tm 113, if necessary.

Notifier [Conference Information Change Notification Program (117)]

The result of an operation related to a session performed by a user through vc_am 111 is reflected on session information managed by vc_sm 109. To present the result to respective users so that they can understand, however, it is necessary to notify vc_am and vc_tm programs each providing an interface to respective users of some change in common information. The conference information change notification program 117 is also called Notifier, which is started by vc_am 111 or vc_tm 113 when the notification is required to issue a change notification to other vc_am or vc_tm programs. This change notification is performed in a socket or an inter-process communication mechanism by RPC.

Although the above main components are distributed in a plurality of programs for packaging in this embodiment, it is also possible to use a system comprises a different combination of the components in the same manner as for this embodiment.

Figure 2:
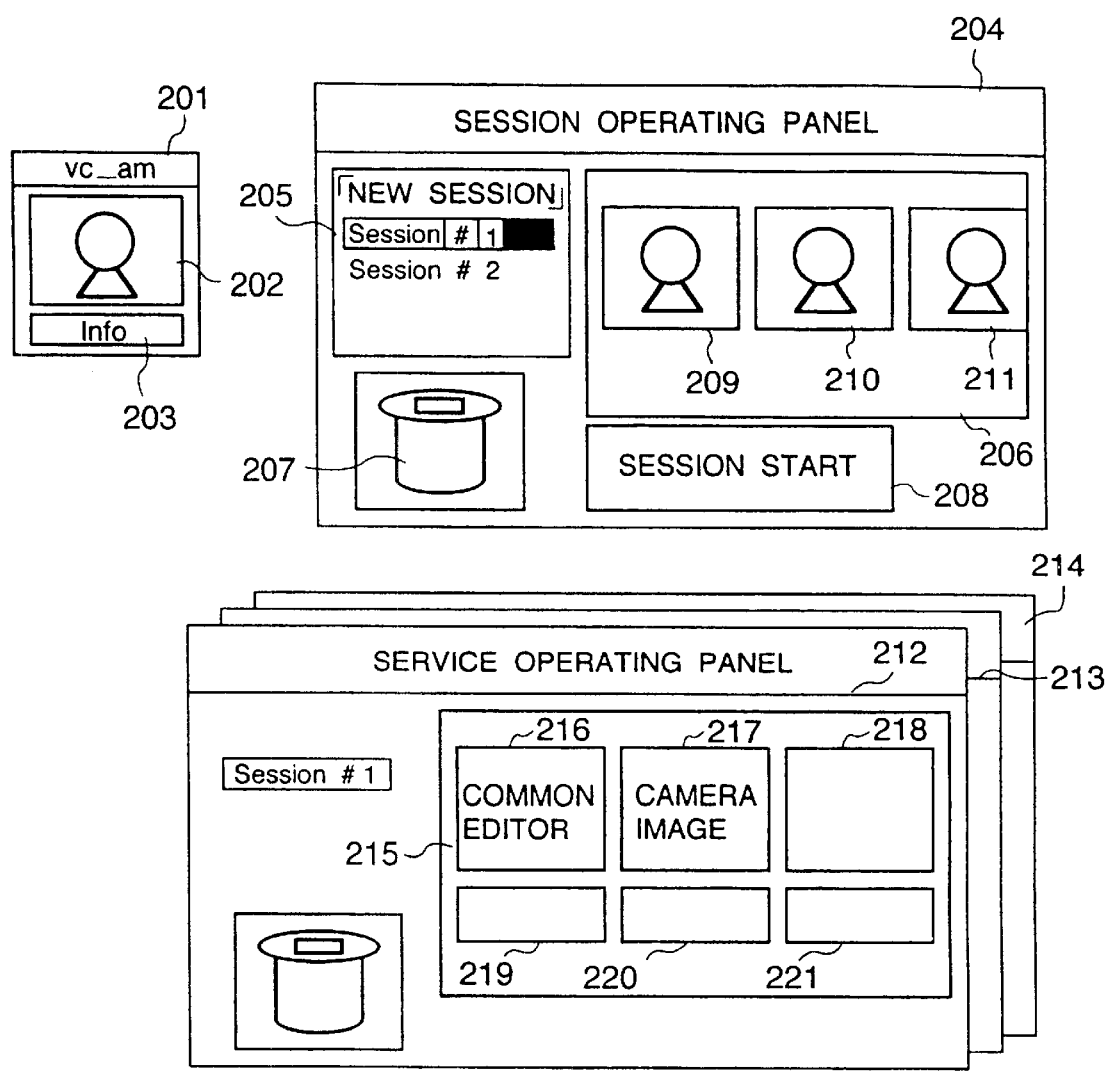
FIG. 2 is a diagram for description of a user interface used in the first embodiment.

Then, referring to FIG. 2, an explanation is made for a user interface of a session and a service operation provided according to this embodiment.

In this embodiment, a user starts to use a conference management system by activating vc_am in his own environment (a workstation dedicated for his own uses), first. A window 201 in FIG. 2 is a vc_am initial window which is displayed at activating vc_am.

The vc_am initial window 201 comprises a user icon field 202 for displaying a user icon which indicates a user who has started vc_am and a status information field 203 for displaying the current status of the user. The user icon is a bit map image created from a photograph of a user face in this embodiment. Anything can be used as a user icon only if it is useful to identify who is the user, for example, a name, a nickname, or the like.

In addition, the following information is displayed in the status information field:
  acceptable (Indicates that a user can participate in a common work.)
  busy (Indicates that a user can participate in only an important common work.)
  unavailable (Indicates that a user can participate in a common work only at emergency.)

The above is stored in a user information 118 by being set by a user with the above described keyboard (not shown). It can be changed by the user. Furthermore, it is also possible to register information on a user status in further detail by clicking on the status information field.

A panel 204 is called a session operating panel, which provides an interface for operating a session supported vc_am 111. The session operating panel 204 is displayed by selecting a "session operating panel" item on a pop up menu which is displayed when a user clicks on the user icon field 202.

There are a session list 205 for displaying names of currently-operating sessions, a session user list 206 for displaying a list of user icons of the current participants of sessions selected on the session list, a trash can field 207 used for deleting a session from the session list (it corresponds to "session finish operation" described later) and for deleting a user from the session user list (it corresponds to "leaving operation from session" described later), and a session start button 208 for starting a session operation in the session operating panel 204.

In FIG. 2, the currently-operating sessions, "Session#1" and "Session#2", are displayed on the session list 205. For "[new session]" at the head of the session list, a session user list can be used for specifying an initial user at the start of a new session by a user's operation of selecting the new session when the new session is started. In FIG. 2, Session#1 is selected by a user and user icons 209, 210, and 211 of the current participants of Session#1 are displayed in the session user list. A user can do the following operations for a session by operating the session operating panel 204:

Starting session

Finishing session

Participating in session

Leaving from session

These operations are models of starting, finishing, (intermediate) participation, and (intermediate) leaving on a conference created in a session for which a workstation is used. The details of these operations are described later, focusing on how they are processed in this system. Panels 212, 213, and 214 are service operating panels for providing user interfaces of vc_tm. The service operating panel 212, 213, and 214, which have the identical configuration, correspond to respective vc_tm programs. Therefore, the service operating panel 212 is used for an explanation. The main component of the service operating panel 212 is a service list 215. Icons 216, 217, and 218 indicating services such as video conference application common window usable in a session are displayed in this service list 215.

In this embodiment, started services are managed with tool numbers attached. The tool number is allocated when a service is started, and the number is unique in the same service in the started session.

Fields 219, 220, and 221 under service icons in the service list 215 are tool lists for displaying lists having service names with their tool numbers attached (the service name combined with the tool number is called a tool name). A component 214 other than the above is a session name field for displaying a name of a session to which vc_tm displaying the panel 212 belongs. A trash can field 215 is used for finishing the service operating currently in the same manner as for the trash can field in the session operating panel.

In other words, service finish processing is executed by a "drag&drop" operation into the trash can field 215 for a service icon or a tool name in the tool list.

Next, it will be explained how the session and service operations are processed by using user interfaces as shown in FIG. 2.

(Starting vc_am)

Figure 3:
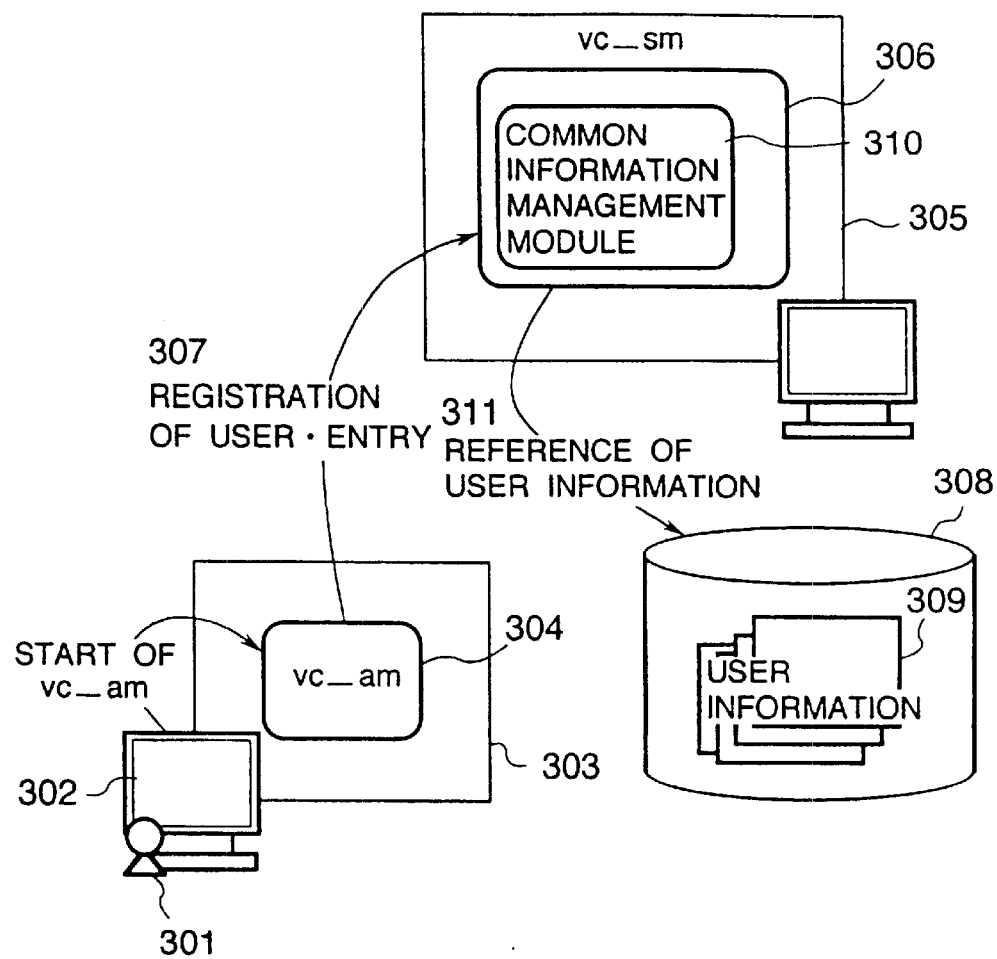
FIG. 3 is a diagram for description of processing at starting a service operation interface program.

A use of a user conference management system is started from activating vc_am (See FIG. 3). For example, when the following is typed through the keyboard as described above in a terminal 302 used by a user 301, vc_am (304) is started in a workstation 303 used by the user 301:

vc_am <RETURN>

The vc_am (304) program notifies vc_sm (306) which is currently operating in the dedicated workstation 305 of the start of using this system by user 301. This notification is called user entry registration notification 307. A name of the user 301 (user name) and a name of the host 302 (host name) used by the user 301 are attached to the user entry registration notification 307. A user in this system can be uniquely identified by specifying the user name and the host name. When the vc_sm (306) program receives the user entry registration notification 307, it fetches user information 309 from a hard disk 308 using the attached user name of user 301 as a key.

(Reference of User Information 311)

The user 301 is associated with the user information 309 by placing the user information 309 on a disk 306 as a file having a user name of the user 301 as its file name.

Therefore, the user information 309 is obtained by fetching a file having a user name of the user 301 as its file name. The vc_sm 306 program fetches a user information 309 and places its memory image under the control of a common information management module 310 for cache to provide for the subsequent user information reference requirements.

It is performed so that the hard disk 308 need not be accessed when other clients require user information 309.

(Starting Session)

A session start processing is described here by using FIGS. 4 and 9A to 9C.

Figure 4:
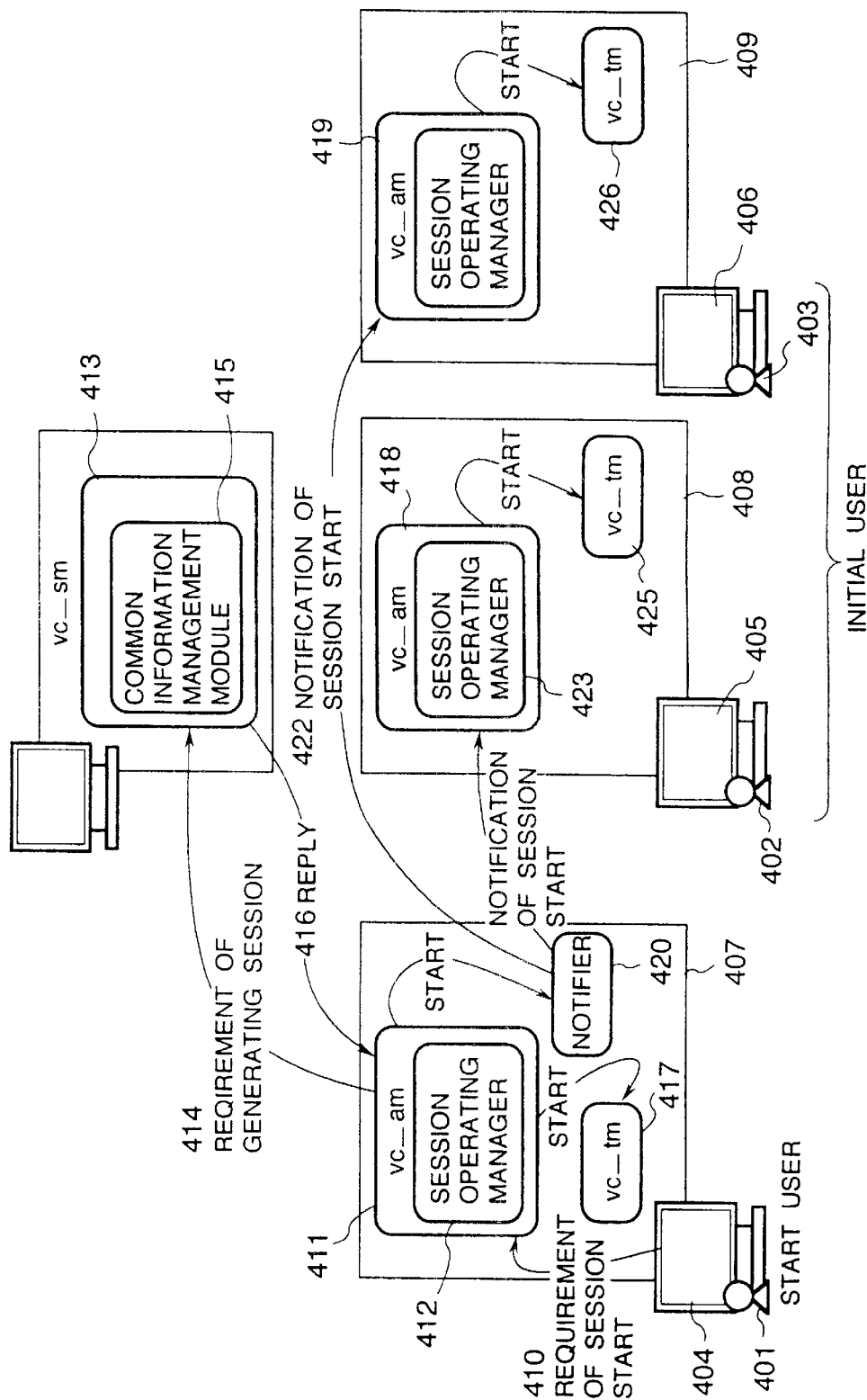
FIG. 4 is a diagram for description of a session start processing flow in the first embodiment.

FIG. 4 illustrates a condition in which a user 401 starts a session (conference) among users 401, 402, and 403 in a state in which three users 401, 402, and 403 have started vc_am programs 410, 418, and 419 in workstations 407, 408, and 409 from terminals 404, 405, and 406.

FIGS. 9A to 9C illustrate a processing flow described in FIG. 4 by using a flowchart; FIG. 9A is a flowchart of vc_am 411, FIG. 9B is that of vc_sm 413, and FIG. 9C is that of Notifier 420. As described about FIG. 2, if the user 401 issues a session start requirement 410 on the session operating window displayed on the terminal 404, the requirement is processed by a session operating manager 412 in vc_am 411.

In other words, the session operating manager 412 issues a new session generating requirement 414 to vc_sm 413, first (S9*a*01). User ids of users 401, 402, and 403 who are initial users of the session are added to this generating requirement 414.

The above requirements are packaged by an inter-process communication mechanism such as a socket or RPC. The same requirement processing described later is also performed by an inter-process communication mechanism.

If the vc_sm 413 program receives a generating requirement 414, it creates a session id and a session name and allocates them to a new session (S9*b*01, S9*b*02). The session id is a 0 or greater integer applied in a generating ascending order from 0 by the common information management module 415, here.

A session name is created as a character string having a character string, "Session #", concatenated with a session id. The session name is managed on vc_sm 413 by the common information management module 415 and added to a reply message 416 to the generating requirement 414, and then returned to vc_am 411 (S9*b*03) to be held by the session operating manager 412. Next, the session operating manager 412 starts vc_tm 417 for displaying a service operating window to permit a use of a service in a session (S9*a*02). Finally, the session operating manager 412 starts Notifier 420 to notify the vc_am 418 and 419 programs of other initial users in the session of the session start (S9*a*03).

The started Notifier 420 fetches information required for opening a communication port with the vc_am 418 and 419 programs out of the user information under the control of vc_sm through a user id of destinations 402 and 403 of a change notification given by vc_am 411 as an argument at the start (S9*c*01).

When the communication port with the vc_am 418 and 419 programs based on the information is opened (S9c02), the Notifier 420 transmits session start notifications 421 and 422 (S9c03). If the session operating managers 423 and 424 in vc_am 418 and 419 receive the notifications 421 and 422, they start vc_tm 425 and 426, respectively. Then, a session start is completed.

(Finishing Session)

Next, session finish processing will be described by using FIGS. 5 and 10.

Figure 5:
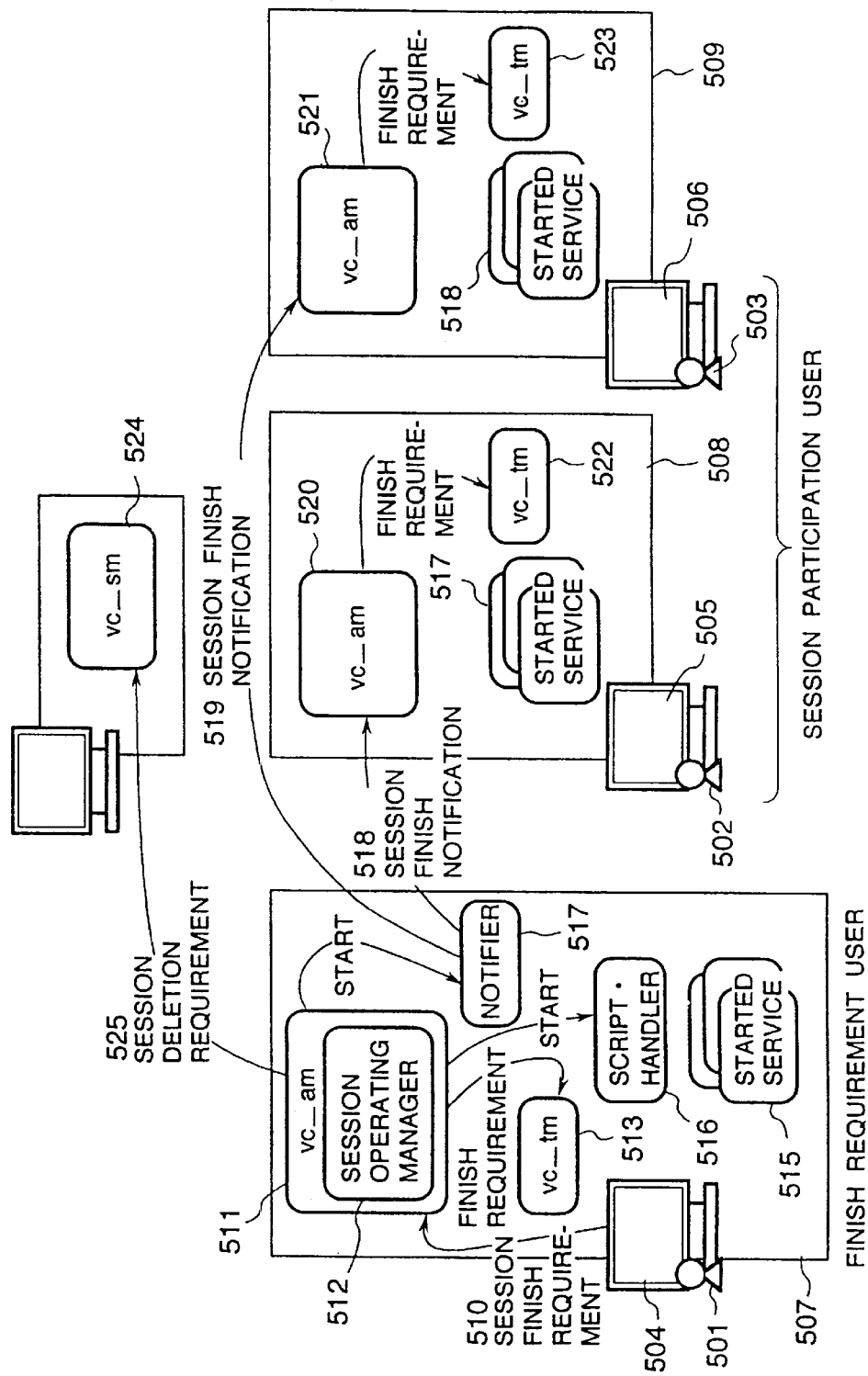
FIG. 5 is a diagram for description of a session finish processing flow in the first embodiment.
Figure 10:
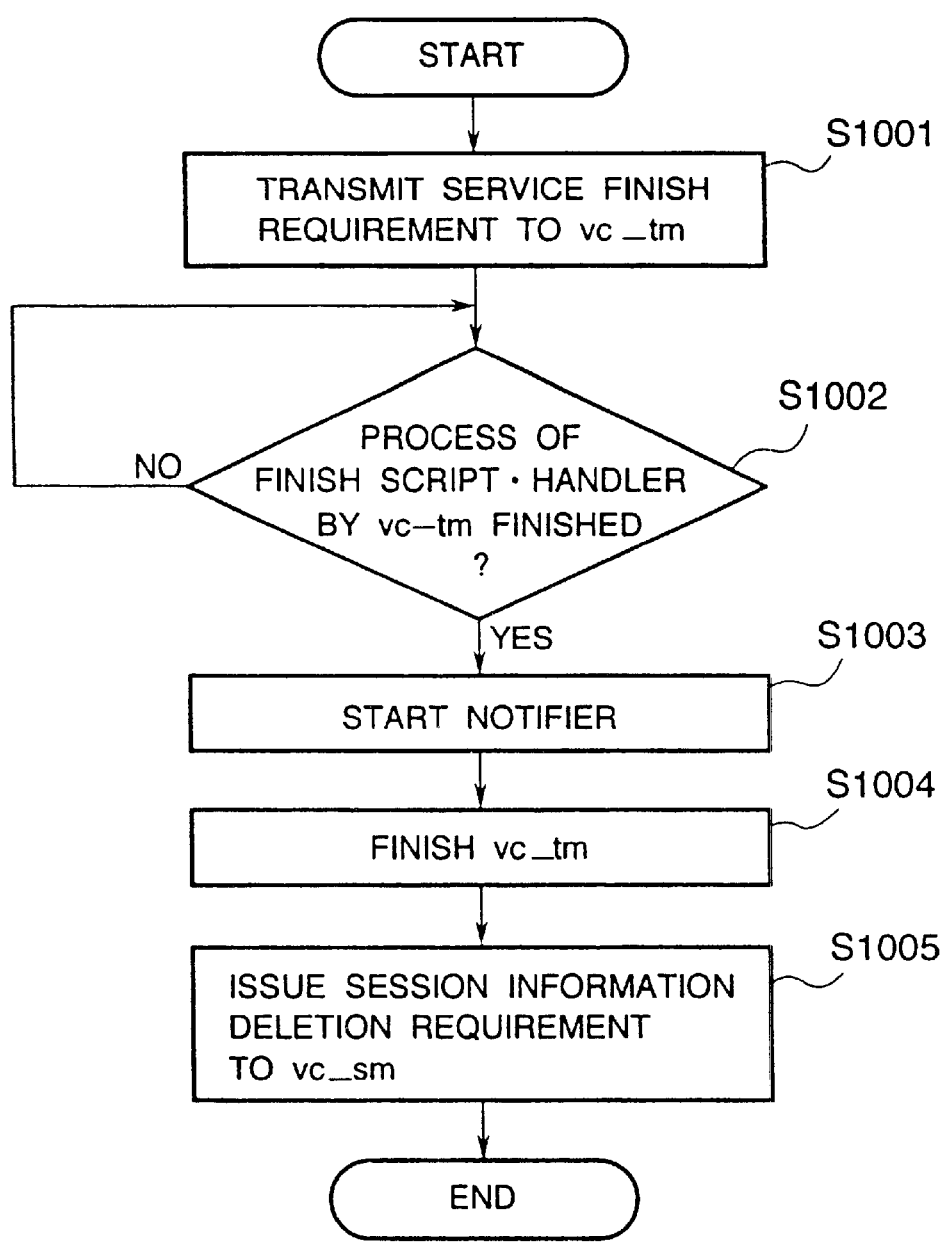
FIG. 10 is a flowchart of the session finish processing in FIG. 5.

FIG. 5 conceptually shows a session finish processing flow, and FIG. 10 shows a flowchart of vc_am 511 processing in FIG. 5.

Referring to FIG. 5, components 501 to 509 correspond to 401 to 409 in FIG. 4.

In session finish processing, if a user 501 performs a session finish operation (in other words, drag&drop of a session name from the session list to a trash can field) on a session operation window on a terminal 504, a session finish requirement 510 is issued to the session operating manager 512 in vc_am 511 to be processed.

If the session operating manager 512 receives the requirement, it issues a finish requirement 514 of a service currently used in the session to vc_tm 513 corresponding to the session to be subject to finish processing in a user environment managed by vc_am 511 (S1001). The vc_am 513 which has received the finish requirement starts a finish script handler 516 of a service 515 currently operating in the session. The finish script handler 516 executes finish processing of the services in all user environments in the session following the description of a finish script. (The details of interpretation and execution of the script will be described later.)

The finish script handler 516 executes not only a service 515 in a user environment of the user 501, but also finish processing of services 517 and 518 in user environments of all users 502 and 503 belonging to the session.

This processing is performed by making a representation executing module in all vc_tm 513, 522, and 523 execute the finish processing. At the completion of finish processing of all services in all users in the session, the finish script handler 516 also terminates the processing.

The vc_am 511 which has detected a termination of the finish script handler 516 with a wait system call described later (S1002) transmits session finish notifications 518 and 519 to vc_am 520 and 521 by starting the Notifier 517 (S1003), and then terminates the vc_tm 513 (S1004). The vc_am 520 and 521 which have received the session finish notifications 518 and 519 also terminate the vc_tm 522 and 523 in the same manner. Finally, the vc_am 511 issues a deletion requirement 525 of a session whose finish processing has been performed to vc_am 524 (S1005). A session id of a session to be deleted is added to the deletion requirement 525. The vc_sm 524 deletes information about the specified session after receiving the deletion requirement. At this point, the session is completely terminated.

(Intermediately Participating in Session)

Figure 6:
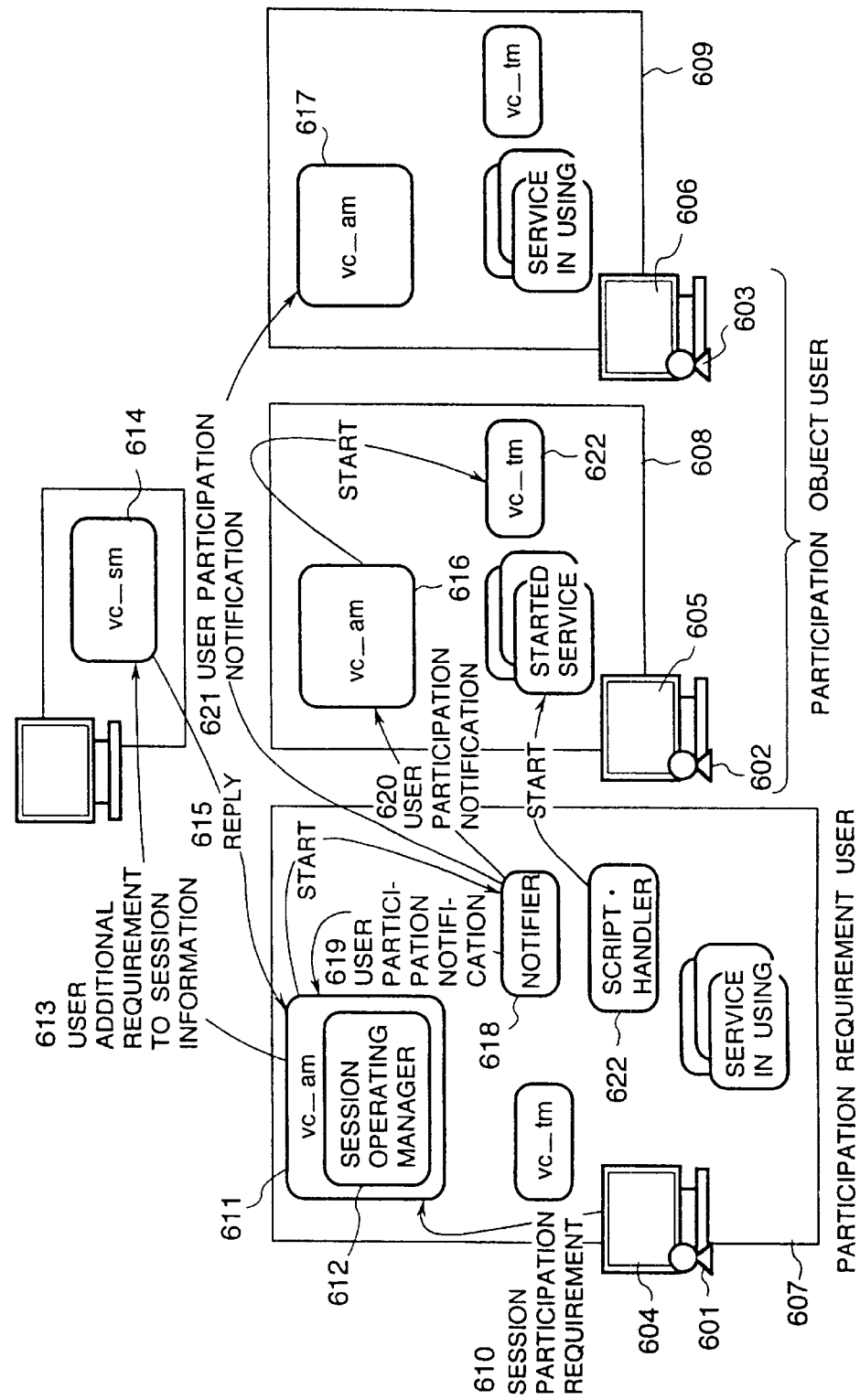
FIG. 6 is a diagram for description of a session participation processing flow in the first embodiment.
Figure 11:
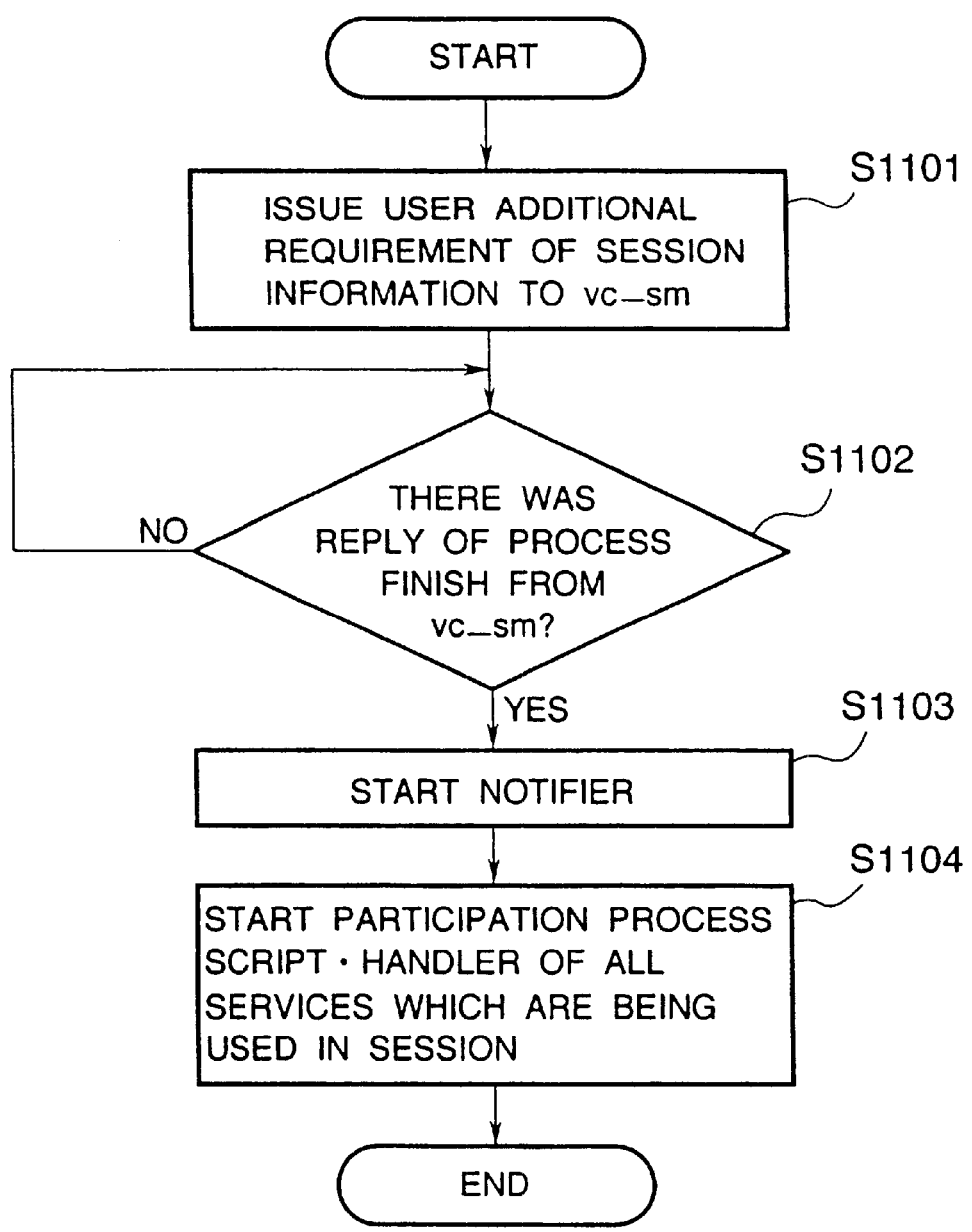
FIG. 11 is a flowchart of the session participation processing in FIG. 6.

Next, session intermediately participating processing will be explained by using FIGS. 6 and 11. FIG. 6 illustrates an intermediate participating processing flow conceptually, and FIG. 11 shows a flowchart of vc_am 611 processing in FIG. 6. In FIG. 6, it is assumed that a user 601 is a user who requires intermediate participating processing and that a user 602 is a user who is an object of the participating processing. In addition, a user 603 is a user who has already been participating the session for the processing. An explanation will be made assuming that the user 601 is participating, though this processing is not affected by whether or not he or she is actually participating in the session for the processing. In other words, it is assumed that the session is performed among a plurality of users including at least users 601 and 603. First of all, the user 601 selects a session name on the session operation window displayed on a terminal 604 and adds a user icon (shown at 202 in FIG. 2) of the user 602 to the session user list by a drag&drop operation, and then a session participating requirement 610 to the selected session is issued to vc_am 611.

When the vc_am 611 receives a user participation requirement 610, a session operating manager 612 issues a user additional requirement 613 to session information to vc_sm 614 (S1101). An id of the session for the processing and a user (602) id are added to the additional requirement 613.

If the vc_sm 614 receives an additional requirement 613, it adds a user id required additionally in participant information in session information of the specified session. At this point, the user 602 is considered to be added to the session on data. If the vc_am 611 receives a reply 615 reporting a termination of the user information additional processing from vc_sm (S1102), it starts Notifier 618 to issue a user participation notification to vc_am 611, 616, 617, and others of the users in the session including the user 602 (S1103). The started Notifier 618 issues intermediate participation notifications 619, 620, and 621.

The vc_am 616 for managing user environments of the user 602 to participate in the session out of the vc_am programs which have received intermediate participation notifications 619, 620, and 621 starts vc_tm 622 to manage services used in the sessions in which the users are participating.

In addition, in other vc_am 612 and 617, a user icon of the new user is displayed on the user list of the session. Participation in a conference management mechanism is completed in this manner. For the user 602 to participate an actual common work, however, services used in the session must be used by the user 602.

To satisfy this requirement, the vc_am 611 starts a participation script handler 622 of all services in use (S1104). The participation script handler 622 executes service intermediate participation processing in the user environment of the user 602 on the basis of a participation script by using the vc_am 616 representation executing module. If the user 602 is only one user participating in the session, the participation script handler 622 does not interpret nor execute a processing script, but a service starting script. This is because nobody has started any services at this point. Like this, an intermediate participation to the session is executed.

(Intermediate Leaving from Session)

Figure 7:
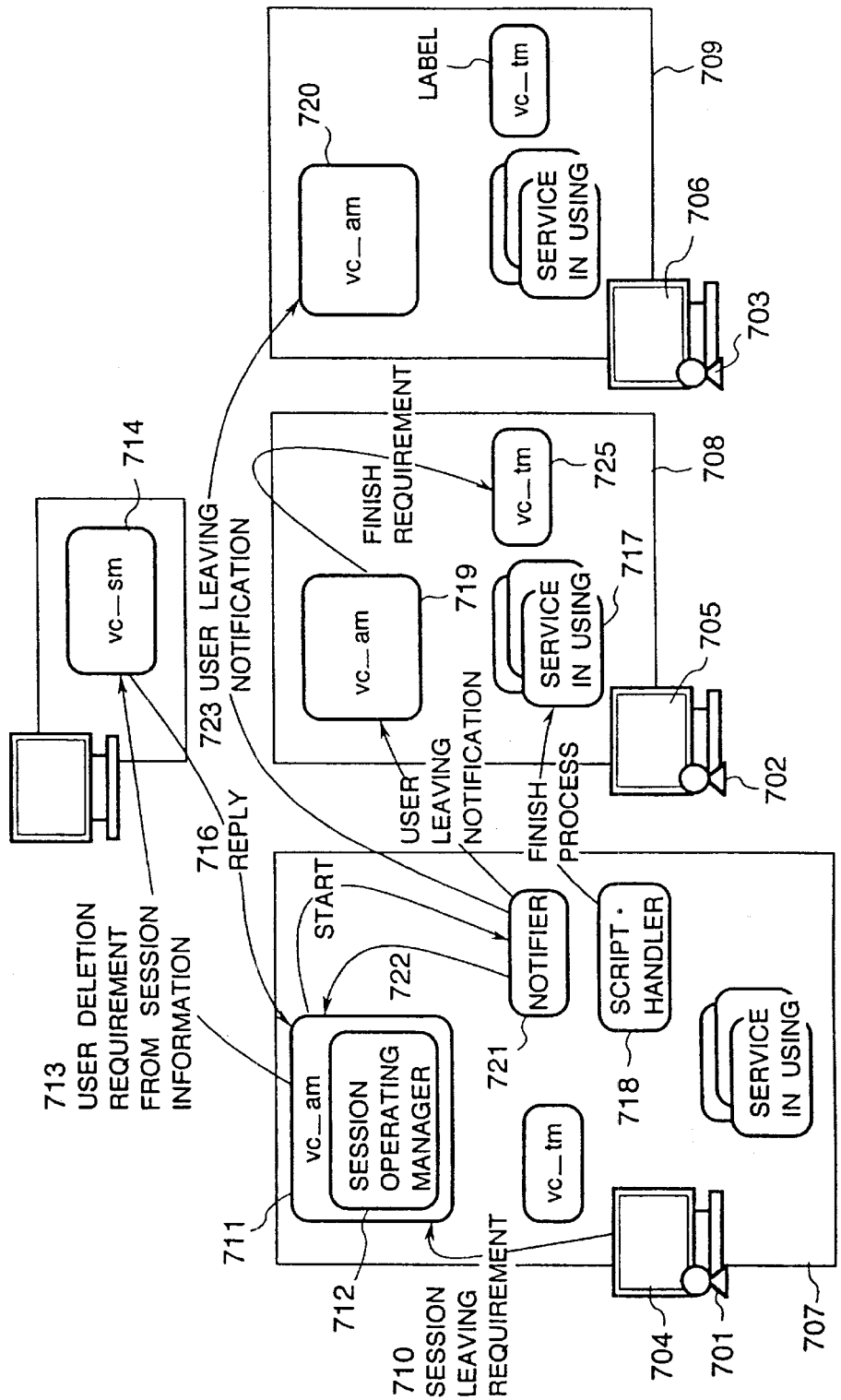
FIG. 7 is a diagram for description of a session leaving processing flow in the first embodiment.
Figure 12:
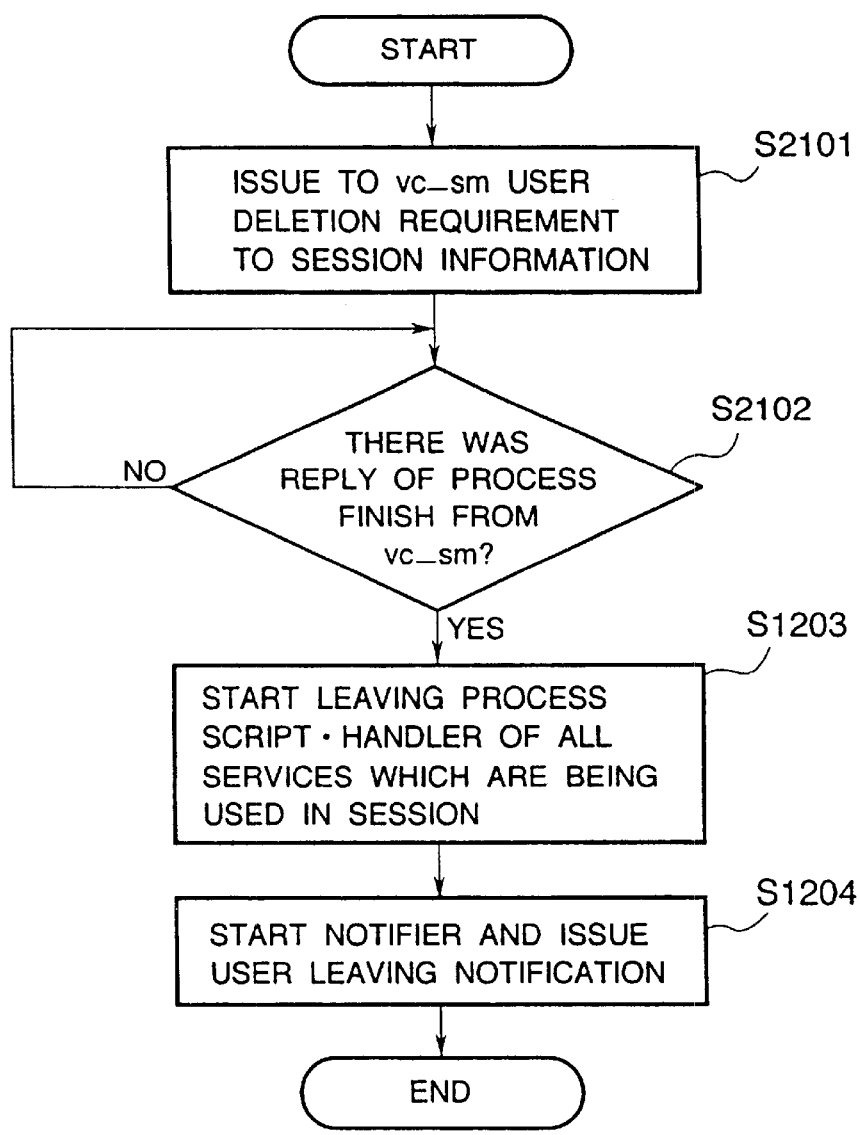
FIG. 12 is a flowchart of the session leaving processing in FIG. 7.

Then, session intermediate leaving processing from a session will be explained by using FIGS. 7 and 12. FIG. 7 illustrates an intermediate leaving processing flow conceptually, and FIG. 12 shows a flowchart of processing of vc_am 711 in FIG. 7.

Referring to FIG. 7, a user 701 is a user who requires intermediate leaving processing and a user 702 is a user who will leave a session. The last user 703 is a user who is not related to leaving processing directly though he or she is participating in the session. An explanation will be made assuming that the user 701 is participating, though this processing is not affected by whether or not he or she is actually participating in the session for the processing.

First of all, the user 701 selects a session name on the session operation window displayed on a terminal 704 and remove a user icon of the user 702 from the session user list to the trash can field by a drag&drop operation, and then a session leaving requirement 710 is issued to vc_am 711.

When the vc_am 711 receives a user leaving requirement 710, a session operating manager 712 issues a user deletion requirement 713 from session information to vc_sm 714 (S1201). An id of the session for the processing and a user (702) id are added to the deletion requirement 713.

When vc_sm 714 receives a deletion requirement 713, it deletes a user id specified from the participant information of the specified session. At this point, the user 702 is considered to have been deleted from the session on data. Therefore, a service 717 which has been used in the session is unnecessary for the user 702 who has deleted from the session. Then, when vc_am 711 receives a reply 716 reporting a termination of user information deletion processing from vc_sm (S1202), it starts a leaving processing script handler 718 of all services in use (S1203).

The leaving processing script handler 718 executes an intermediate leaving processing of services in the user environment of the user 702 following the description of the intermediate leaving processing script. If only the user 702 is participating in the session, however, the leaving processing script handler 718 does not interpret nor execute the leaving processing script, but a service finish processing script.

This is because nobody need not use any services at this point. Finally, vc_am 711 starts Notifier 721 to issue a user leaving notification to all users of vc_am 711, 719, and 720 in the session including the user 702 (S1204).

The started Notifier 721 issues immediate leaving notifications 722, 723, and 724. vc_am 719 for managing the user environment of the user 702 who is to leave out of the vc_am programs which have received intermediate leaving notifications 722, 723, and 724 terminates vc_tm 725 started to manage the service. In other vc_am 711 and 720 programs, user icons of the user who has left is removed from the user list of the session, and leaving processing from the session is completed. The outline is explained in the above, and then the service control with a service script is described below. First, the service script itself is explained. This script is previously set in WS 825 by users.

In this embodiment, the scripts corresponding to the above service start/finish and user intermediate participating/intermediate leaving are described in the following files, respectively;

<<Service name>>.start
<<Service name>>.terminate
<<Service name>>.join
<<Service name>>.disjoin Example)

TvPhone.start, TvPhone,terminate, TvPhone.join, TvPhone.disjoin

The basic syntax of a script which can be described in each file is as follows;

<<Wait flag>> <<Executionuser>> <<Program>> <<Argument>> . . .

The "Wait flag" is used to indicate whether or not a caller (that is, a script handler) should be kept waiting until the program specified by the above "program" terminates. This wait function is effective to use a content processed by programs sequentially such that a result of processing executed by a called program is used for processing executed by the subsequently called program. One of the following types of the values for the Wait flag;

| %%nowait | # Wait is not executed. |
| %%wait | # Wait is executed. |
| %%waitstatus | # Wait is executed and an exit | value specified at the termination of <<Program>> is checked. If the value is not zero, an execution of the script is stopped immediately.

The "Execution user" is used to specify which user's environment the program specified by the "program" should be executed in. The execution user takes one of the following values;

| %requser | # User who has required an operation |
| %startrequeser | # User who has started a conference |
| %targetuser | # User who is a target of operation (It cannot be used in the .start and .terminate scripts.) |
| %operateuser | # User who processes the operation actually (Its specification is equal to the specification of %requser in a start or finish operation of a tool or %targetuser in other cases.) |
| %alluser | # All users in session |
| username@hostname | # User direct description with user name and host name |

"Program" and "Argument" are a program to be started and its argument, respectively. An application itself, a preprocessing program, or the like is specified here. In addition, the following values can be specified for arguments;

| %sessionname | # Session name |
| %sessionid | # Session number |
| %servicename | # Service name |
| %serviceid | # Service number |
| %toolname | # Tool name |
| %toolid | # Tool number |
| %username | # User name (The same user as for %operateuser) |
| %userid | # User number (The same user as for %operateuser) |
| %hostname | # Host name (Host used by %operateuser) |
| %userhost | # Character string made of %username concatenated with %hostname via '@' (The same user as for %operateuser) |

If new services (applications) are added to terminals constituting a session successively, a user can incorporate the added services into a common work by setting scripts for the new services.

Figure 13:
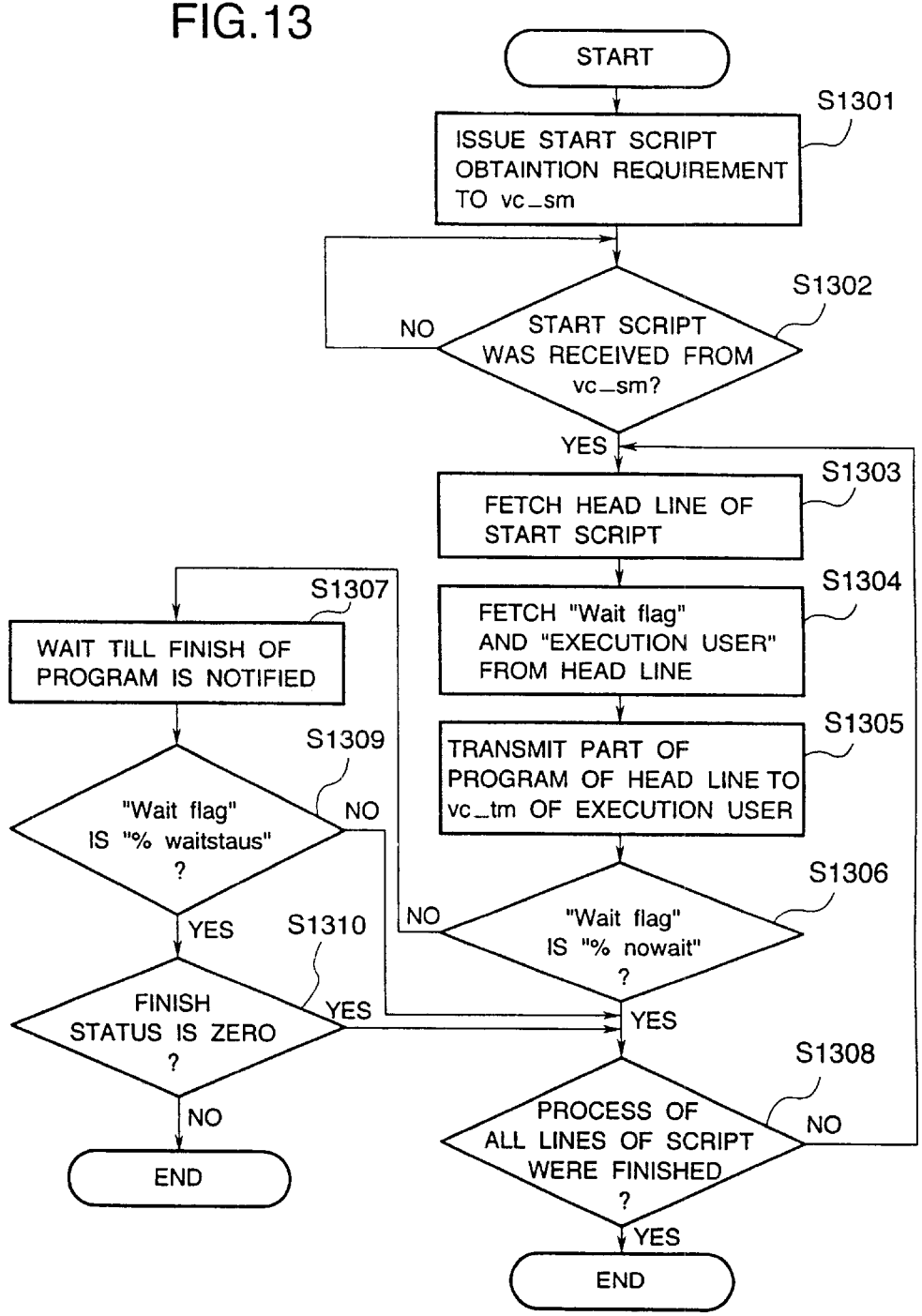
FIG. 13 is a flowchart of the service start processing in FIG. 8.

Then, the state of the execution of a service script described in the above syntax will be explained by using FIGS. 8 and 13.

Figure 8:
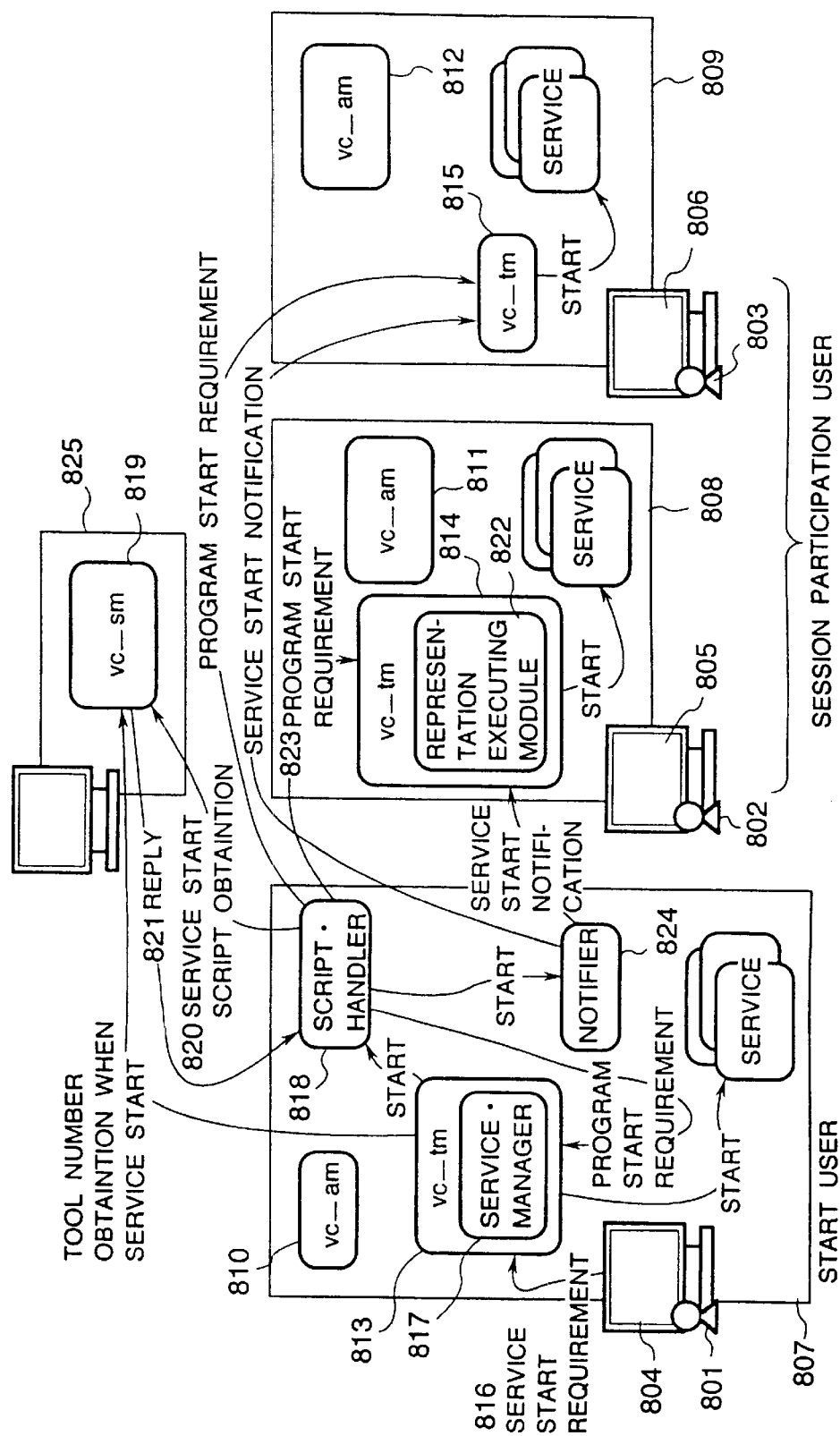
FIG. 8 is a diagram for description of a service start processing flow in the first embodiment.

FIG. 8 illustrates a condition in which a service is started in vc_tm. Although this section describes the execution for starting a service, it is the same for other executions for finish, intermediate participation, and intermediate leaving processing of a service. FIG. 13 is a flowchart of processing of a script handler 818 in FIG. 8.

In FIG. 8, it is assumed that three users 801, 802, and 803 start vc_am 810, 811, and 812 on workstations 807, 808, and 809 from terminals 804, 805, and 806 in the same manner as for FIG. 4 to participate in the same session. Since the users are participating in the session, vc_tm 813, 814, and 815 programs for managing and operating a service in the session are started in each user environment. For starting the service, a service start requirement 816 is issued to vc_tm 813 when the user 801 clicks on a service icon on the service operation window displayed on the terminal 804 as described in FIG. 2.

When the vc_tm 813 receives the service start requirement 816, an internal service manager 817 starts the start script handler 818. The start script handler 818 issues a start script obtention requirement 820 to vc_sm 819, first (S1301). IDs of a started session, a user, and a service are added to the start script obtention requirement 820. When the vc_sm 819 receives a start script obtention requirement 820, it replaces the added IDs of the session, the user, and the service with specific words beginning with % such as %requser in the service script. This replacement is packaged as a simple character string replacement.

When the word replacement is completed, the service script is added to a reply message 821 of the script obtention requirement 820 and then transmitted to the script handler 818. If the script handler 818 receives the start script (S1302), it fetches the first line out of the start script, first (S1303), and then removes a "Wait flag" and an "execution user" from the fetched line (S1304).

Then, the script handler issues a program start requirement 823 to a representation executing module 822 of vc_tm (814) operating in the environment of a user specified by an "execution user" (temporarily assumed to be 802) to start the "program" remaining after removing the "Wait flag" and the "execution user".

A communication port number of the vc_tm can be obtained from a user id specified by the "execution user" by calculating the following expression;

vc_tm communication port number=(0×100000+*user id*)

Since an application itself which is a substance of the service or a command for starting the application is specified for this "program" generally, the service start processing is almost completed at this point. If the "Wait flag" is not %nowait here, the program waits until it receives a notification of a "program" termination from the vc_tm 814 (S1307). In addition, the program checks a finish status value added to the finish notification (S1309) if the "Wait flag" is %waitstatus, and it stops the script processing if the flag is not 0 (S1310). The above processing is repeated for all the lines of the starting script (S1308). Finally, the vc_tm 813 starts the Notifier 824 to notify all vc_tm 814 and 815 in the session of some change related to the service, and then the service start processing is terminated. As described in the above, there are provided vc_am as a means for defining a session as a user collection and vc_tm as a means for operating a session as a service collection, and a script handler for processing a session operation as a service operation by allowing a means for specifying the service operation to be described in a form of a service script information in this embodiment. Furthermore, there are provided vc_sm as a means for obtaining information on a session or a user and a Notifier as a means for propagating a session operation by a user to the entire system in the script handler processing.

In this embodiment according to the present invention, it becomes possible to perform processing of individual applications to be used for the session operations according to the settings of a script previously registered by a user, if necessary. In addition, a specific mechanism is unnecessary for modification or changes since service operation specifications are managed as normal text files.

[Other Embodiments]

Although an embodiment of the present invention in the conference management system is described in the first embodiment, a common work support system for supporting an asynchronous common work is described as the second embodiment of the present invention.

The asynchronous common work does not mean a work which participants perform simultaneously, but works which are performed in various time bands by respective users for a certain period continuously. This system makes it possible to put together the works into a single common work finally. In other words, while the "common work" in the first embodiment supports a conference which is performed by several users who has gathered simultaneously at the same place, the "common work" in the second embodiment supports intermittent exchanges for a long period via electric mails.

Figure 14:
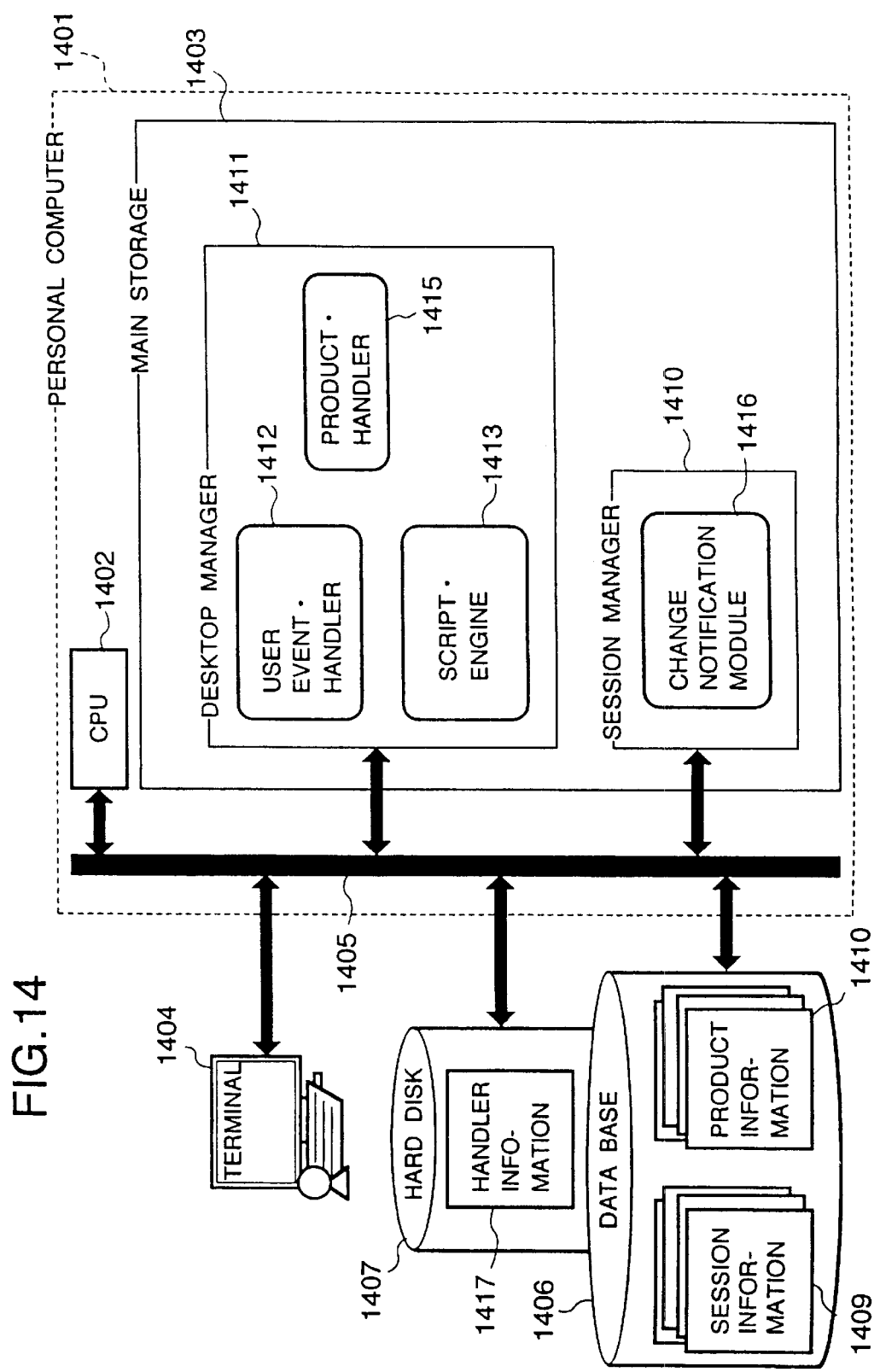
FIG. 14 is an asynchronous common work support system of a second embodiment of the present invention.

An object for modeling is not a common work itself, but data for the common work being treated as a "session". Accordingly, while the "session" in the first embodiment is materialized as a collection of applications called services, the "session" in this embodiment is materialized as a unit for treating a collection of data (document, image, etc.) for the common work. FIG. 14 shows a main configuration diagram of this embodiment. In this drawing, a personal computer (hereinafter, also called just a machine) (1401) comprises a CPU 1402 for executing processing in this embodiment, a session manager 1410 which is a basic software of this system, and a main storage 1403 for storing a desktop manager 1411 coupled each other via a computer path 1405.

In addition, a data base 1406 for storing common data required for an operation of this system, a hard disk 1407 for storing permanent data not shared, but used for processing described later, and a terminal 1404 for providing a user interface required for a user to operate the system are coupled to the machine 1401. For a database 1406, any type of a database can be used only if it has a mechanism of permanent data and consistent management, for example, a general relational database or an object-oriented database. In addition, the vc_sm in the first embodiment can be appropriated to realize this embodiment.

A session manager 1408 operating in the main storage 1403 manages the following information by using the database 1406;

Session information (1409)

Product information (1410)

The session information 1409 is a common information comprising a list of data (called product) such as a document which is an object of a common work and its related information (change history, etc.). A name (session name) and an id number (session id) are allocated to the session information 1409. The session name is a character string specified by a user at creating the session and the session id is an integer greater than zero allocated by the session manager 1408 at creating the session. A corresponding relationship between the session id and the session name is also managed as a part of the session information 1409. The product information 1410 is information on a product constituting the session. It is used mainly for managing a place where an entity of a product is located, an owner, a change history, a data type, or the like.

The product information 1410 is also managed by using a product name and a product id in the same manner as for the session information 1409. The session manager 1408 is started for each user every time unlike vc_sm in the first embodiment. The consistent management of common data in this embodiment is actualized by the database 1406. Instead, the session manager 1408 contains a change notification module 1416.

It is because changes such as updating common information on the session manager 1408 must be reported to all related desktop managers also in this embodiment.

In the same manner as for the session manager 1408, the desktop manager 1411 operating in the main storage 1403 performs an appropriate operation of the session according to a request from the user. The desktop manager 1411 is internally divided into the following modules.

User Event Handler 1412

The user event handler 1412 is a module for interpreting an operation performed by a user and issuing a command for other module operations. A user interface in this embodiment is materialized as a command interpreter through a TCL script language (for information about the TCL, refer to "Tcl and the Tk Toolkit", John K. Ousterhout, Addison-Wesley, 1994), and a user event handler and other modules are also packaged by expanding the TCL interpreter. Therefore, a command issued by the user event handler 1412 is also described in the TCL.

Script Engine 1413

Handler information 1417 managed in the hard disk 1407 includes a description of how to treat respective products in an appropriate session. This description is called a script also in this embodiment. Some commands added to the TCL are used for the description of the script. The script engine 1413 is materialized as an interpreter for interpreting and executing a script in the handler information 1417. A script of this embodiment becomes usable by adding an operator description having the following names in the TCL to the handler information;

checkin-service-<<product name>>
checkout-service-<<product name>>
The following example is a script for product name,

```
"FigureOnSomething.ps";
checkin-service-FigureOnSomething.ps {} {
    global temp-dir;
    checkin-file-as "$temp-dir/FigureOnSomething.ps" ¥
        FigureOnSomething.ps;
}
checkout-service-FigureOnSomething.ps {} {
    global temp-dir;
    checkout-file-as FigureOnSomething.ps ¥
        "$temp-dir/FigureOnSomething.ps";
    exec idxaw "$temp-dir/FigureOnSomething.ps";
}
```

As shown in this example, the following is prepared as pre-defined commands;
checkout-file-as<<product name>><<copy location>>
checkin-file-as<<copy location>><<product name>>

The checkout-file-as command is used to copy a product specified in the "product name" into the "copy location" with considering it as a file. If the checkout-file-as command is issued, the specified product cannot be checked out nor changed until a checkin-file-as command is issued subsequently. On the contrary, the checkin-file-as command is used to register a copy in the "copy location" into the product information as the latest product with the "product name". After that, data in the "copy location" is considered as an original product. The checkout-file-as and checkin-file-as commands are actualized by using a file transfer or file sharing mechanism such as an FTP (file transfer protocol) or an NFS (network file system).

Product Handler 1415

If a user performs a work on a product, the user occupies the product temporarily before making some change. This occupation is called checkout. On the contrary, processing corresponding to releasing the product which has been occupied once is called checkin. Although the checkin or checkout processing can be performed for each product, it is also possible to perform checkin or checkout processing in units of a session which is a collection of products. The product handler 1415 is a module for managing products after checkout until the time immediately before checkin.

In other words, the product handler manages a correspondence between a copy of a product accompanying checkout and its original. In addition, a management of handler information 1417 is also performed by the product handler 1415. Although the session manager 1410 and the desktop manager 1411 exist on the same machine in FIG. 14, it is also possible to make the session manager 1410 operate on another machine coupled to another network in the same manner as for the vc_sm in the first embodiment in this system. In the "session" in this embodiment, the following operations can be performed;

Generating session
Deleting session
Checkin of session
Checkout of session
Adding product to session
Deleting product from session In the description below, the following typical models of these operations will be explained;

Generating session
Checkin of session (Generating Session)

Figure 15:
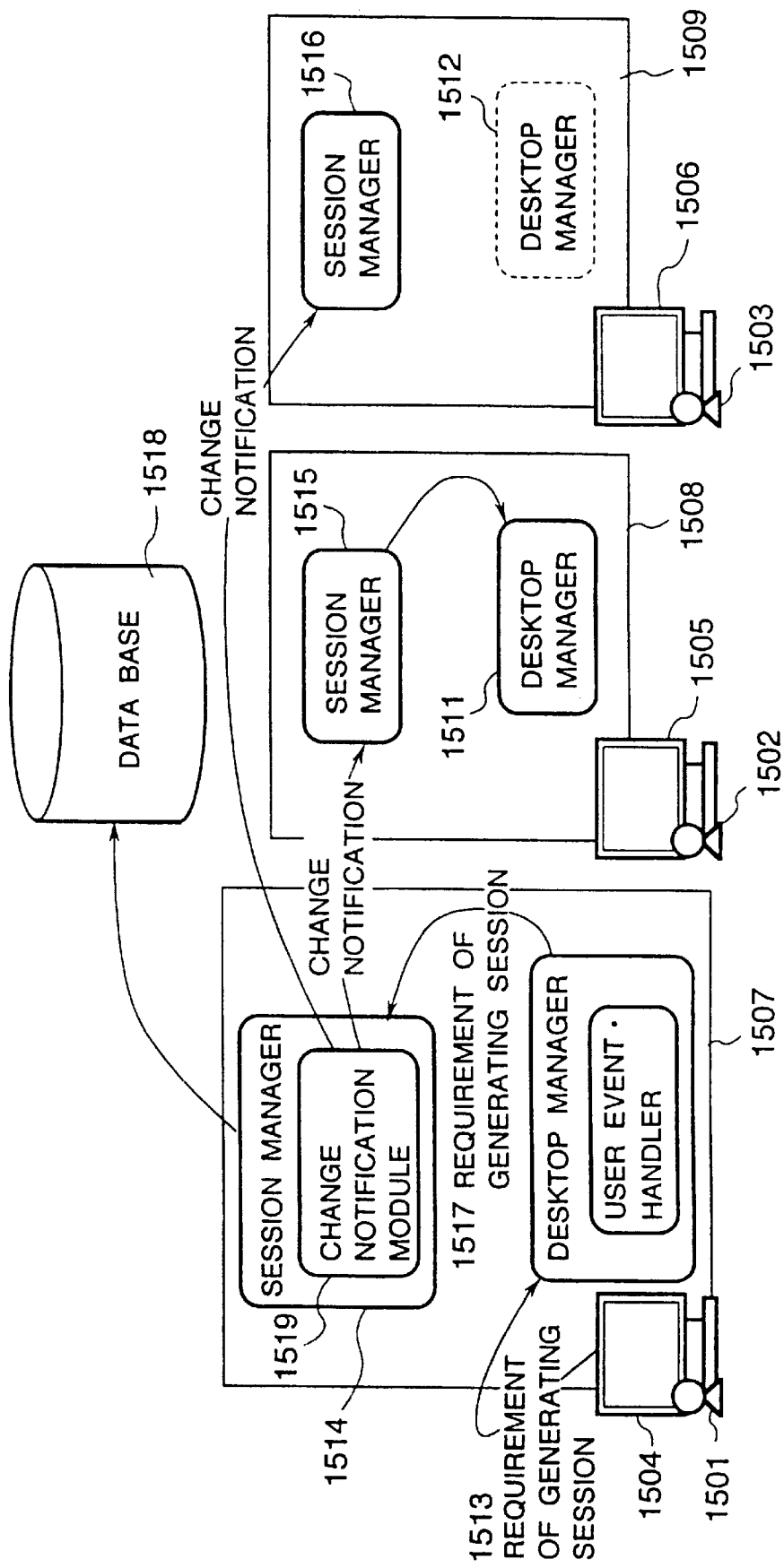
FIG. 15 is a diagram for description of a session generation processing in the second embodiment.
Figure 17A:
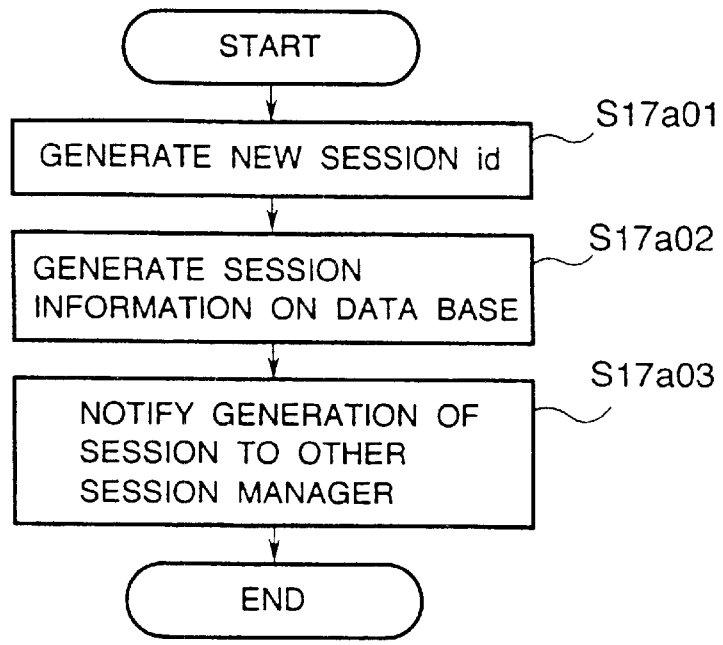
FIGS. 17A and 17B are flowcharts representing the session manager processing in FIG. 15.
Figure 17B:
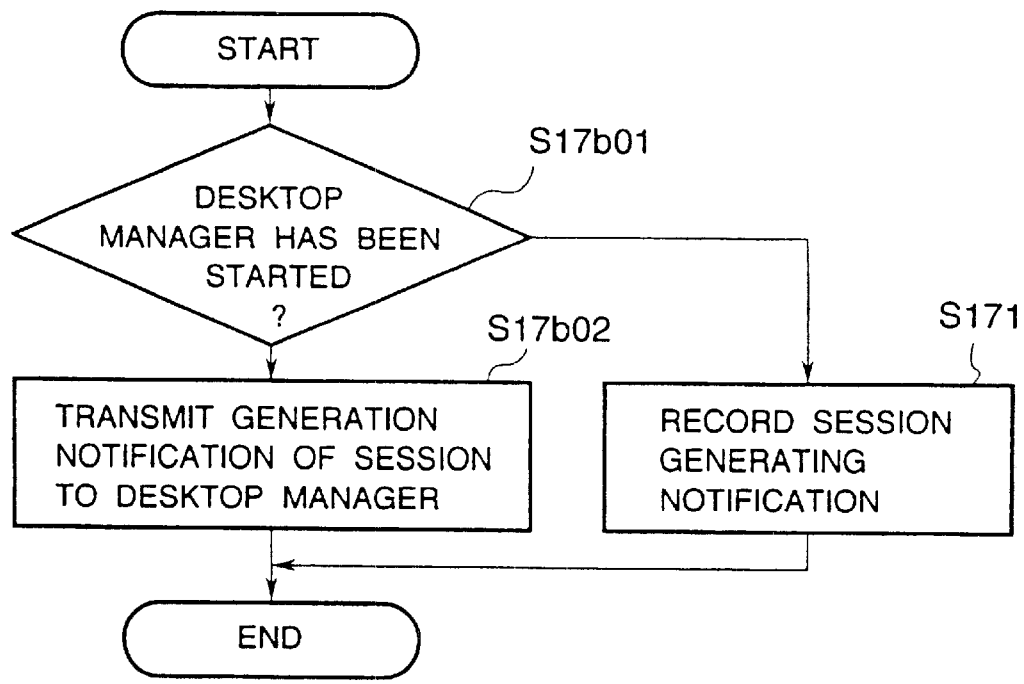

Session generating processing in this embodiment is described by using FIGS. 15, 17A and 17B. FIG. 15 shows a session generating processing flow conceptually. In FIGS. 17A and 17B, FIG. 17A is a flowchart of a session manager 1514 processing and FIG. 17B is a flowchart of a session manager 1515 and 1516 processing. In FIG. 15, three users 1501, 1502, and 1503 are working on machines 1507, 1508, and 1509 from terminals 1504, 1505, and 1506. It is assumed that the users 1501 and 1502 have started the desktop managers 1510 and 1511, respectively, so that they can use the system, while the user 1503 has not started the desktop manager 1512 at this point. However, it is also assumed that the session managers 1514, 1515, and 1516 are always operating in each user environment.

Then, it is supposed that the user 1501 has requested generating a session, here. Although a user interface for making a request from the user 1501 can be materialized by a window-based GUI like the first embodiment, a character-terminal-based text interface is applied to it here, in which a session generation requirement 1513 is issued to the desktop manager 1510 when the user 1501 types a command, "CreateSession."

Then, a user name list specified as an argument of a CreateSession command is added to the session generation requirement 1513. It is assumed that three users 1501, 1502, and 1503 in the drawing are specified here. The session generation requirement 1513 is interpreted by a user event handler 1520 to execute the processing below.

Therefore, a session generation requirement 1517 is issued to the session manager 1514, first. A session name of a newly generated session and user names of the users who can operate the session (1501, 1502, and 1503) are added to the session generation requirement 1517. The session manager 1514 generates a session id of the newly generated session (S17a01), and then generates session information on a database 1518 (S17a02). The new session id is generated by "session id+1" of the latest session information which has been already generated.

Next, a change notification module 1519 in the session manager 1514 notifies (1520, 1521) the session managers 1515 and 1516 operating in the user environments of the users 1502 and 1503 of session generation (S17a03).

Each session manager notifies the desktop manager of the session generation notification (S17b02) if the desktop manager is started in the user environment (S17b01). In FIG. 15, this processing is exchanged between the session manager 1515 and desktop manager 1511.

Since the desktop manager 1512 is not started in the session manager 1516, the notification 1521 is previously recorded, and then it is issued after starting the desktop manager 1512 (S17b03).

(Checkout of Session)

Figure 16:
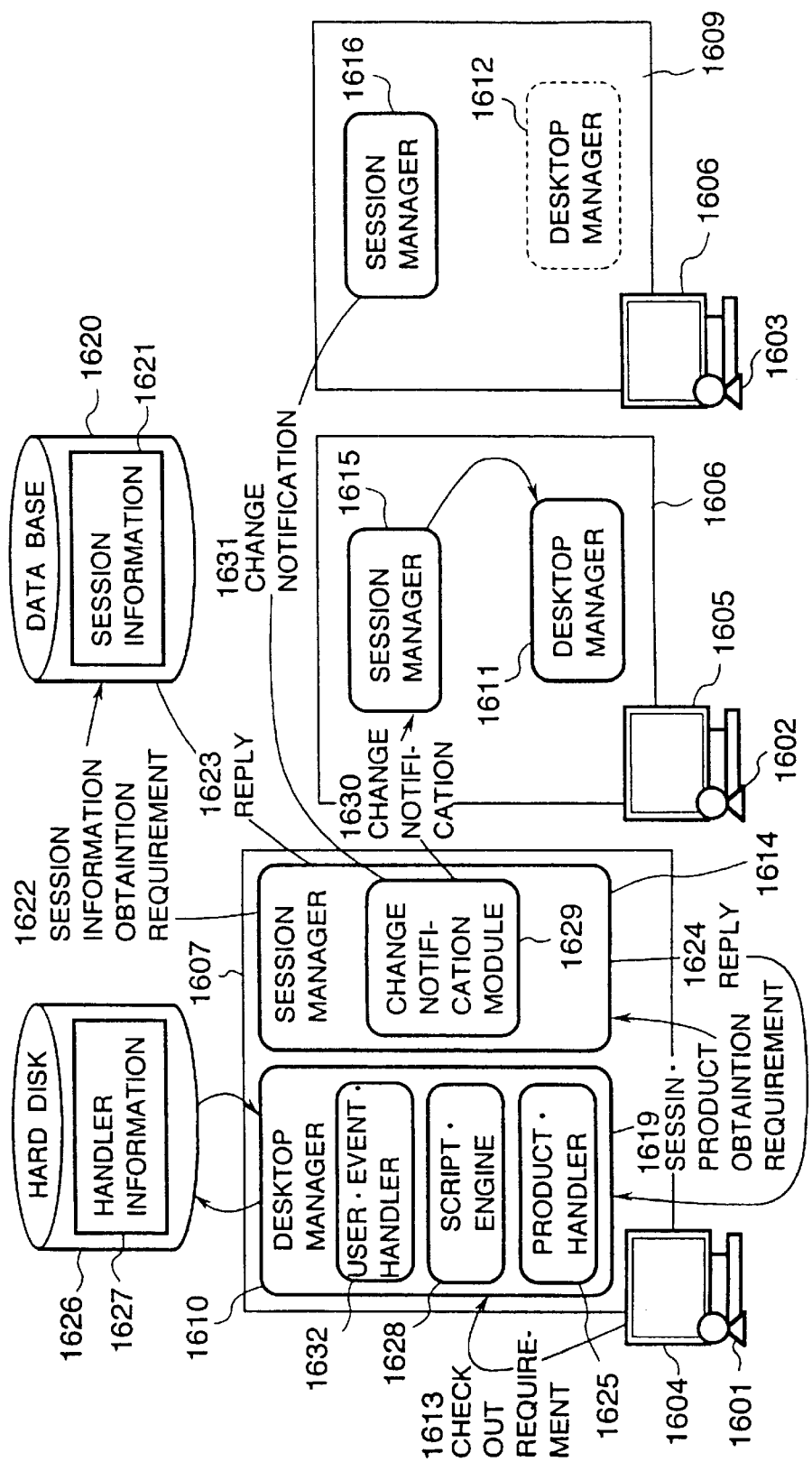
FIG. 16 is a diagram for description of a session checkout processing flow in the second embodiment.

FIG. 16 is a diagram for description of session checkout processing. FIG. 18 is a flowchart of operations of the desktop manager in FIG. 16. A script in this embodiment can be defined only for checkout and checkin processing.

In FIG. 16, three users 1601, 1602, and 1603 are working on machines 1607, 1608, and 1609 from terminals 1604, 1605, and 1606, respectively. It is assumed that the users 1601 and 1602 have started the desktop managers 1610 and 1611, respectively, so that they can use the system, while the user 1603 has not started the desktop manager 1612 at this point. However, it is also assumed that the session managers 1614, 1615, and 1616 are always operating in each user environment.

It is supposed that the user 1601 types a command, "CheckoutSession<<session name>>" to issue a session checkout requirement 1613 to the desktop manager 1610. Then, a session name specified as an argument of the ChcekoutSession command is added to the session checkout requirement 1613. The requirement 1613 is interpreted by the user event handler 1632 to execute the following processing. Therefore, a session product obtention requirement 1619 is issued to the session manager 1614, first (S1801). The session manager 1614 issues a obtention requirement 1622 of session information 1621 treating a session name as a key to a database 1620. Then, the handler fetches a product name list when it receives the session information added to a reply 1623 of the database 1620, and adds it to a reply 1624 of the session product obtention requirement 1619 to return it to the desktop manager 1610.

The desktop manager 1610 fetches the added product name list from the reply (S1803) after it receives the reply (S1802). Next, a product handler 1625 in the desktop manager 1610 fetches a product name at the head of the list which it has received (S1804), fetches the corresponding handler information 1627 from a hard disk 1626 (S1805), and further fetches the following checkout processing description from a script description in a handler information 1627 (S1806), so that a script engine 1628 can interpret and execute the description (S1807);

checkout-service-<<product name>>

For all products in the product name list, processing from S1804 to S1808 is repeated (S1808).

When the above processing is completed for all products, the desktop manager 1610 requests the session manager 1615 to issue the same notification as for starting a session (S1809). The session manager processing for this notification is the same as that of the flowchart in FIG. 17B except that the session generating notification is replaced by a checkout notification. In other words, a change notification module 1629 in the session manager 1615 notifies (1630, 1631) the session managers 1615 and 1616 operating in the user environments of the user 1602 and 1603 of the session checkout processing. After that, the notification 1630 is transferred between the session manager 1615 and desktop manager 1611. In the session manager 1616, however, the desktop manager 1612 is not started yet, therefore, the notification 1631 is previously recorded and it is issued after the desktop manager 1612 is started.

In this embodiment as described in the above, there are provided a product handler as means for defining a session as a collection of products and for making a Ynoindent session operating as a collection of processing programs of the products and a script engine as a means for processing the session operation as a product operation, as well as a means for specifying a product operation method can be described in a form of handler information. In addition, there are provided a session manager as a means for obtaining information related to a session or users in script engine processing and a change notification module as a means for propagating a session operation performed by a user to the entire system. Since the handler information is defined for each user in this embodiment, it becomes possible to handle respective products referenced for operations on a session by using an application most favorable to users. Since a session is formed mainly based on data, a common work environment can be offered without being aware of the users participating in the session.

As described above, in a groupware system for supporting a common work, there is provided a means in which a user can perform operations in units of a session in the following conditions;

Means for specifying a unit (session) for common work

Specified session in the above

Furthermore, by providing a means for describing the above operation as an operation to a session component and a means for interpreting and executing the session operation described by the description means, the following features can be obtained;

A common work can be supported on a computer and users need not be aware of details of an application form of the common work during a use of the system.

A common work can be performed with the most appropriate processing for its components.

It becomes possible to cope with a dynamic change of the components of a common work flexibly.

It is to be understood that the present invention also covers a system in which various devices are operated based on a program stored in a computer (CPU or MPU) in a system or a device connected to the devices so as to be operated so that the functions of the above embodiments can be effected by supplying a program code of software for effecting the functions of the above embodiments to the computer.

In this case, the software program code itself performs the functions of the embodiments, and the present invention comprises the program code itself and a means for supplying the program code to the computer, for example, a storage medium containing the program code.

A storage medium which can be used for storing the program code is, for example, a floppy disk, a hard disk, an optical disk, an optical magnetic disk, a CD-ROM, a magnetic tape, a nonvolatile memory card, a ROM, or the like.

It is further understood that the program code is within the scope of the embodiments of the present invention also when the functions of the embodiments are effected not only when the computer executes the given program code, but also when the program code is shared with an operating system which is operating in the computer or with another application software.

It is still further understood that the present invention includes a case that the supplied program code is stored in a memory installed in a computer feature expansion board or a feature expansion unit connected to the computer and then a part or all of the actual processing is performed by a CPU or the like in the feature expansion board or the feature expansion unit following an instruction of the program code to perform the functions of the above embodiments.

What is claimed is:

1. A processing system for performing a common work in a work environment composed of one or more terminal apparatuses, comprising:

providing means for providing user status information as common information of the one or more terminal apparatuses;

designation means for designating participants in a common work and an application to be utilized as a unit of the common work;

instruction means for instructing an operation in the common work unit;

describing means for describing the operation of the common work unit, by using a command string; and executing means for executing the operation described by said describing means.

2. An apparatus according to claim 1, wherein said execution means comprises means for obtaining information on the common work unit and the common work participants and notification means for propagating a result of the operation to the entire system.

3. An apparatus according to claim 2, further comprising processing representation means for making it possible to execute an arbitrary operation in other user environments.

4. An apparatus according to claim 1, wherein said common work unit is designated from a collection of participants in the common work and application programs that can be used in performing the common work.

5. An apparatus according to claim 4, wherein operations available to be performed as the operation in the common work unit includes start processing, finish processing, adding a participant, deleting a participant, starting an application program, or finishing an application program in the common work unit.

6. An apparatus according to claim 5, wherein said instruction of the operation in the common work unit is performed by a drag and drop operation of an icon on a graphical user interface.

7. An apparatus according to claim 5, further comprising means for adding, updating, and referencing information about the status of components of the common work unit in addition to said operations in the common work unit.

8. An apparatus according to claim 1, wherein said common work unit is designated as a collection of data.

9. An apparatus according to claim 8, wherein operations available as said operation include generation of the common work unit, deletion of the common work unit, adding data to the common work unit, deleting data from the common work unit, occupation (checkout) of data in the common work unit, or checkin of data that had previously been checked out in the common work unit.

10. An apparatus according to claim 1, wherein the command string is a script language.

11. An apparatus according to claim 1, wherein said command string includes information about designating a user environment in which a command should be executed.

12. An apparatus according to claim 11, wherein an abstract user name is specified for said user environment specification.

13. An apparatus according to claim 1, wherein an abstract user name, a session name, and an application name are designated as arguments of the command string.

14. A processing method for performing a common work in a work environment composed of one or more terminal apparatuses, comprising the steps of:

providing user status information as common information of the one or more terminal apparatuses;

designating participants in a common work and an application to be utilized as a unit of the common work;

instructing an operation in the common work unit;

describing the operation of the common work unit, by using a command string; and executing the operation described in said describing step.

* * * * *

UNITED STATES PATENT AND TRADEMARK OFFICE
CERTIFICATE OF CORRECTION

PATENT NO.     : 6,598,073 B2
DATED          : July 22, 2003
INVENTOR(S)    : Toshihiko Fukasawa et al.

It is certified that error appears in the above-identified patent and that said Letters Patent is hereby corrected as shown below:

Drawings,
Sheet 14, FIG. 14, Ref. No. 1417, "INFO-" should read -- INFOR- --;
Sheet 18, FIG. 18, Ref. No. S1809, "OBTAINTION" should read
-- OBTAINMENT --; and Ref. No. S1801, "t CHECK" should read -- CHECK --.

Signed and Sealed this

Eleventh Day of November, 2003

JAMES E. ROGAN
*Director of the United States Patent and Trademark Office*